(12) United States Patent
Takeda et al.

(10) Patent No.: US 10,988,691 B2
(45) Date of Patent: Apr. 27, 2021

(54) LIQUID-CRYSTAL MEDIUM

(71) Applicant: Merck Patent GmbH, Darmstadt (DE)

(72) Inventors: Takanori Takeda, Atsugi (JP);
Masahiko Okamura, Atsugi (JP);
Norihiko Tanaka, Kawagoe (JP);
Yasushi Sugiyama, Sagamihara (JP)

(73) Assignee: Merck Patent GmbH, Darmstadt (DE)

( * ) Notice: Subject to any disclaimer, the term of this patent is extended or adjusted under 35 U.S.C. 154(b) by 28 days.

(21) Appl. No.: 15/746,157

(22) PCT Filed: Jul. 12, 2016

(86) PCT No.: PCT/EP2016/001196
§ 371 (c)(1),
(2) Date: Jan. 19, 2018

(87) PCT Pub. No.: WO2017/012700
PCT Pub. Date: Jan. 26, 2017

(65) Prior Publication Data
US 2018/0230381 A1 Aug. 16, 2018

(30) Foreign Application Priority Data

Jul. 21, 2015 (EP) .................................. 15002154

(51) Int. Cl.
| | | |
|---|---|---|
| *G02F 1/1333* | (2006.01) | |
| *C09K 19/20* | (2006.01) | |
| *C09K 19/30* | (2006.01) | |
| *C09K 19/04* | (2006.01) | |
| *C09K 19/12* | (2006.01) | |

(52) U.S. Cl.
CPC .......... *C09K 19/20* (2013.01); *C09K 19/3066* (2013.01); *C09K 2019/0466* (2013.01); *C09K 2019/123* (2013.01); *C09K 2019/124* (2013.01); *C09K 2019/3004* (2013.01); *C09K 2019/3025* (2013.01)

(58) Field of Classification Search
CPC ................ C09K 19/20; C09K 19/3066; C09K 2019/0466; C09K 2019/123; C09K 2019/124; C09K 2019/3004; C09K 2019/3025; G02F 1/1333
USPC .................................................... 252/299.61
See application file for complete search history.

(56) References Cited

U.S. PATENT DOCUMENTS

| | | | |
|---|---|---|---|
| 7,579,053 B2 | 8/2009 | Czanta | |
| 8,013,967 B2 | 9/2011 | Kim | |
| 8,178,173 B1 | 5/2012 | Matsumoto | |
| 8,486,298 B2 | 7/2013 | Hirschmann | |
| 8,506,842 B2 | 8/2013 | Miyairi et al. | |
| 8,585,925 B2 | 11/2013 | Czanta | |
| 9,062,247 B2* | 6/2015 | Kawamura | C09K 19/3066 |
| 2010/0026953 A1 | 2/2010 | Hirschmann et al. | |
| 2011/0233466 A1 | 9/2011 | Jansen et al. | |
| 2015/0159089 A1 | 6/2015 | Kawamura et al. | |

FOREIGN PATENT DOCUMENTS

| | | |
|---|---|---|
| CN | 102498189 A | 6/2012 |
| DE | 102007041245 A1 | 3/2008 |
| EP | 1726633 A1 | 11/2006 |
| EP | 2457975 A2 | 5/2012 |
| JP | 10333171 A | 12/1998 |
| JP | 2010501688 A | 1/2010 |
| JP | 2011195587 A | 10/2011 |
| JP | 2014185323 A | 10/2014 |
| WO | 2010089092 A1 | 8/2010 |

OTHER PUBLICATIONS

International Search Report PCT/EP2016/001196 dated Oct. 12, 2016.
Office Action in corresponding ROC (Taiwan) Patent Application No. 105122946 dated Feb. 25, 2020 (Office Action pp. 1-7 and English translation pp. 1-6).
English translation of Office Action in corresponding JP application 2018-502812 dated Aug. 11, 2020 (pp. 1-3 ).

\* cited by examiner

*Primary Examiner* — Geraldina Visconti
(74) *Attorney, Agent, or Firm* — Millen White Zelano & Branigan, PC; Brion P. Heaney

(57) ABSTRACT

The present invention relates to dielectrically positive liquid-crystalline media comprising one or more compounds of the formula I and II

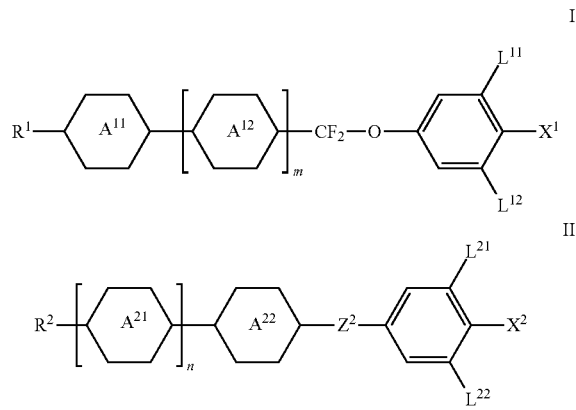

in which the parameters have the respective meanings indicated in claim 1, and to liquid-crystal displays, especially active-matrix displays and in particular displays of the vertically aligned mode, containing these media.

16 Claims, No Drawings

LIQUID-CRYSTAL MEDIUM

FIELD OF THE INVENTION

The present invention relates to liquid-crystalline (LC) media with positive dielectric anisotropy (Δε) and to liquid-crystal displays containing these media, especially to displays addressed by an active matrix and in particular to displays of the VA mode.

BACKGROUND OF THE INVENTION

There is a great demand for liquid crystal displays (LCD), in particular of the matrix type, which have at the same time very high specific resistance as well as a large working-temperature range, short response times even at low temperatures and low threshold voltages. LC media are required which facilitate the following advantages in LC cells:
- extended nematic phase range (in particular down to low temperatures)
- the ability to switch at extremely low temperatures (outdoor use, automobile, avionics)
- increased resistance to UV radiation (longer service life).

For LC cells, LC media are desired which enable greater multiplexability, lower threshold voltages and broader nematic phase ranges, in particular at low temperatures. A further widening of the available parameter latitude (clearing point, smectic-nematic transition or melting point, viscosity, dielectric parameters, elastic parameters) is also desired. Also, the LC media should have favourable values of ratio of the elastic constants K33/K11.

For TV, mobile and monitor applications, LC media are desired which have a fast response time and a low threshold voltage, furthermore a good LTS (low temperature stability).

Also, depending on the thickness of the switchable LC layer, a moderate or high birefringence may be required. However, the LC media known in prior art have the disadvantage that they often do not allow all these requirements to be achieved simultaneously, without negatively affecting the other parameters of the LC cell.

The display mode of LC panels is determined in accordance with how to get LCs in an LC cell to align. TN (Twisted Nematic) mode, MVA (Multi-domain Vertical Alignment) mode, IPS (In-plane Switching) mode, OCB (Optically self-Compensated Birefringence) mode, and the like, are known as conventional LC panel display modes.

Among these, TN-LCD panels have been widely used, but have disadvantages such as slow response time and narrow viewing angle. Further, an MVA mode (MVA-LCD) also has been known. In this mode, a pixel electrode in an active matrix substrate is provided with slits, and projections (ribs) for LC alignment control are formed on a counter electrode in a counter substrate, and the slits and the projections are used to form a fringe field, thereby aligning LC molecules in multiple different directions. In the MVA mode, each pixel region is divided into plural regions different in alignment direction of LC molecules, and thus multi-domain can be achieved per pixel region. Therefore, a widening of the viewing angle is allowed. Further, the MVA mode is one kind of VA mode, so that it provides contrast ratio (CR) higher than that of the respective TN, IPS, and OCB modes. However, the MVA mode still has room for improvements because it requires complicated production processes, and as in TN mode, has slow response time. Recently, there has been proposed a TBA (Transverse Bend Alignment) mode where nematic LCs with positive dielectric anisotropy (Δε) (hereinafter, also referred to positive nematic LCs) are used as an LC material, and the initial alignment of the LC molecules is vertical alignment, and comb-like electrodes are used to apply a voltage to the LC medium. In this mode, a pair of comb-like electrodes forms a transverse electric field, and under the influence of this electric field, the alignment behaviour of LC molecules is shown. The TBA mode is one kind of VA mode, so that it provides high contrast ratio. Further, the TBA mode requires no alignment control attributed to projections, and therefore, it has a simple pixel configuration and has excellent viewing angle characteristics. The TBA mode is described e.g. in JP H-10-333171 and in U.S. Pat. No. 8,178,173 B1.

The present invention has the aim of providing an LC medium that does not have the abovementioned disadvantages or only does so to a reduced extent, particularly used for active matrix displays). The LC medium preferably simultaneously has a very high specific resistance, a low threshold voltage, a low rotational viscosity, a broad nematic phase range with high clearing point, an improved LTS and fast switching times. Another aim of the present invention is to extend the pool of LC media available to the expert. Other aims of the present invention are immediately evident from the following description.

SUMMARY OF THE INVENTION

Surprisingly, it has now been found that it is possible to achieve liquid-crystalline media having a suitably high Δε, a suitable phase range and suitable Δn which do not have the disadvantages of the materials from the prior art, or at least only do so to a significantly reduced extent.

The invention relates to a liquid-crystalline medium having a nematic phase and positive dielectric anisotropy which comprises
a) a total of ≥65% of one or more compounds selected from the group of the compounds of the formulae I and II

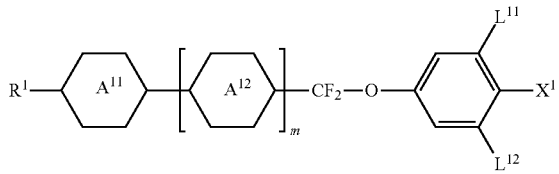

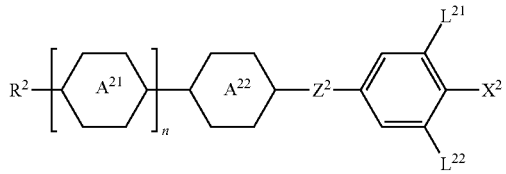

in which
R$^1$ and R$^2$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and R$^1$ and R$^2$ preferably denote alkyl or alkenyl,

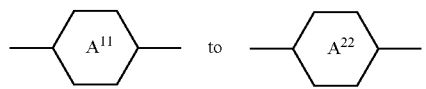

on each appearance, independently of one another, denote

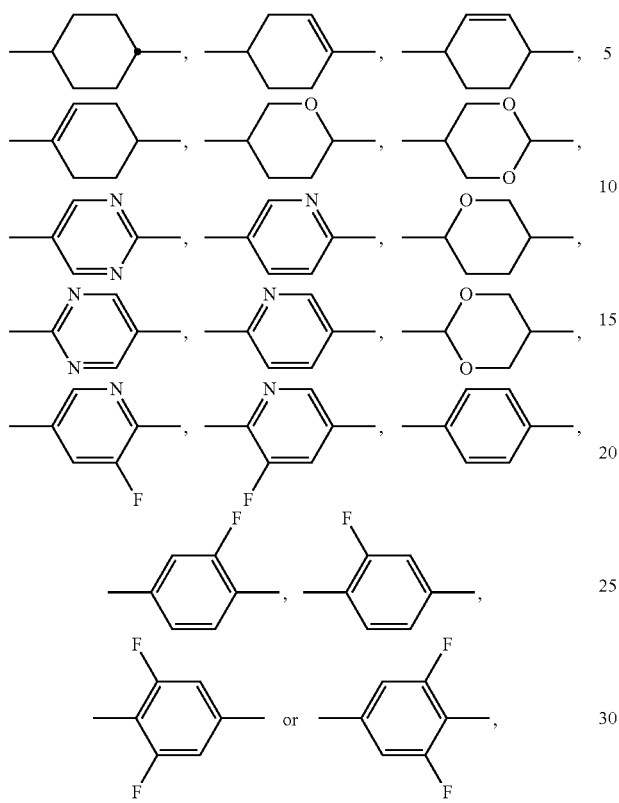

preferably

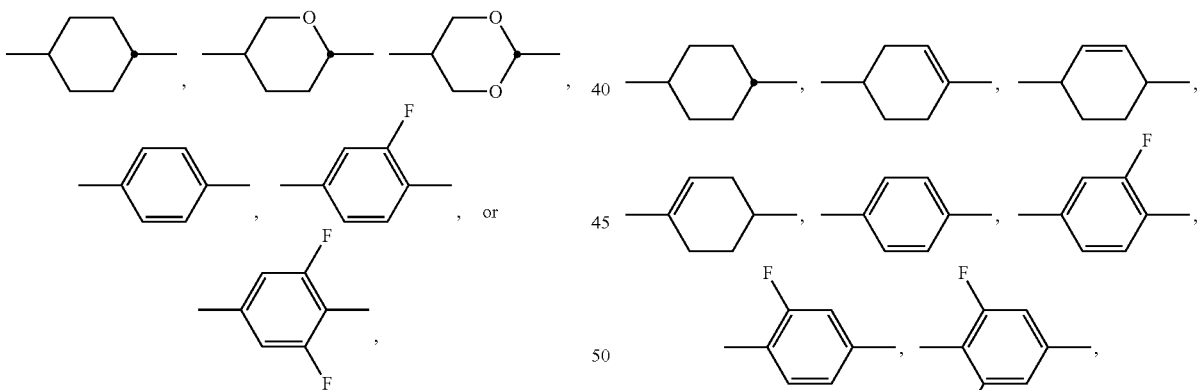

$L^{11}$, $L^{12}$, $L^{21}$ and $L^{22}$, independently of one another, denote H or F, preferably
$L^{11}$ and/or $L^{21}$ denote F,
$X^1$ and $X^2$, independently of one another, denote halogen, halogenated alkyl or alkoxy having 1 to 3 C atoms or halogenated alkenyl or alkenyloxy having 2 or 3 C atoms, preferably F, Cl, —$OCF_3$ or —$CF_3$, very preferably F, or —$OCF_3$,
$Z^2$ denotes —$CH_2CH_2$—, —$CF_2CF_2$—, —COO—, trans-CH=CH—, trans-CF=CF—, —$CH_2O$— or a single bond, preferably —$CH_2CH_2$—, —COO—, trans-CH=CH— or a single bond and very preferably —COO—, trans-CH=CH— or a single bond, and
m and n, independently of one another, denote 0, 1, 2 or 3, m preferably denotes 1, 2 or 3, and
n preferably denotes 0, 1 or 2 and particularly preferably 1 or 2,
and
b) one or more compounds of the formula III

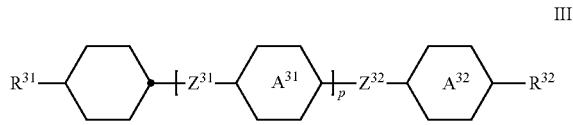

in which
$R^{31}$ and $R^{32}$, independently of one another, have the meaning indicated for $R^1$ above under formula I, preferably $R^{31}$ denotes alkyl and $R^{32}$ denotes alkyl or alkoxy or $R^{31}$ denotes alkenyl and $R^{32}$ denotes alkyl,

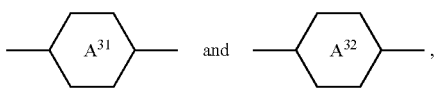

independently of one another and, if

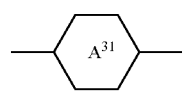

occurs twice, also these independently of one another, denote

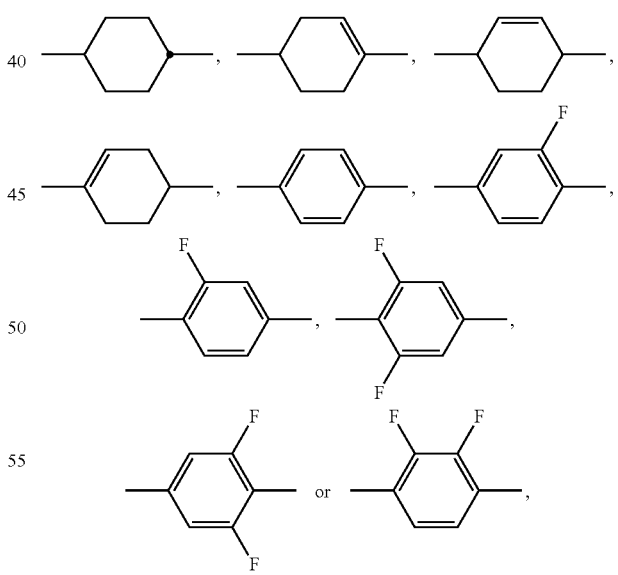

preferably one or more of

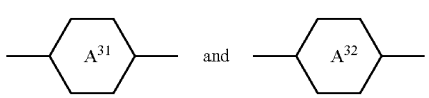

denote(s)

$Z^{31}$ and $Z^{32}$, independently of one another and, if $Z^{31}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

DETAILED DESCRIPTION OF THE INVENTION

In the present application, the elements all include their respective isotopes. In particular, one or more H in the compounds may be replaced by D, and this is also particularly preferred in some embodiments. A correspondingly high degree of deuteration of the corresponding compounds enables, for example, detection and recognition of the compounds. This is very helpful in some cases when for example compounds are used in small concentrations.

In the present application, alkyl particularly preferably denotes straight-chain alkyl, in particular CH$_3$—, C$_2$H$_5$—, n-C$_3$H$_7$—, n-C$_4$H$_9$— or n-C$_5$H$_{11}$—, and alkenyl particularly preferably denotes CH$_2$=CH—, E-CH$_3$—CH=CH—, CH$_2$=CH—CH$_2$—CH$_2$—, E-CH$_3$—CH=CH—CH$_2$—CH$_2$— or E-(n-C$_3$H$_7$)—CH=CH—.

In a preferred embodiment of the present invention, the media according to the invention comprise one or more compounds of the formula I, preferably selected from the preferred sub-formulae thereof, and one or more compounds of the formula II, preferably selected from the preferred sub-formulae thereof, and one or more compounds of the formula III, preferably selected from the preferred sub-formulae thereof.

The compounds of the formulae I and II are preferably dielectrically positive compounds, preferably having a dielectric anisotropy of greater than 3.

The compounds of the formula III are preferably dielectrically neutral compounds, preferably having a dielectric anisotropy in the range from −1.5 to 3.

The individual compounds of the formulae I and II are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, its concentration can thus be in the range from 2 to 20%, preferably from 3 to 14%.

In a preferred embodiment of the present invention, the media according to the invention comprise one or more compounds selected from the group of the compounds of the formulae I-1 to I-2,

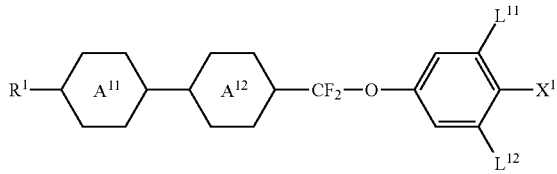

I-1

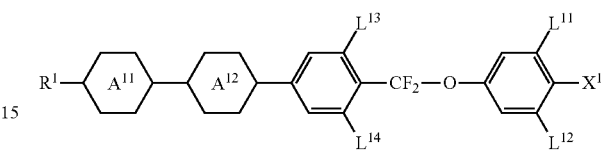

I-2 in which the parameters have the respective meanings indicated above under formula I, and $L^{13}$ and $L^{14}$, independently of one another, denote H or F, preferably $L^{13}$ denotes F, and selected from the group of the compounds of the formula II-1:

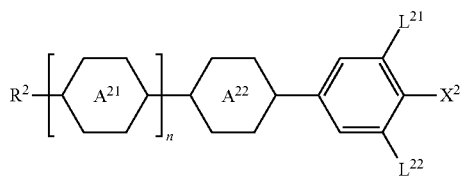

II-1 in which the parameters have the meaning given under formula II.

The media preferably comprise one or more compounds of the formula I-1. The compounds of the formula I-1 are preferably selected from the group of the compounds of the formulae I-1a to I-1e

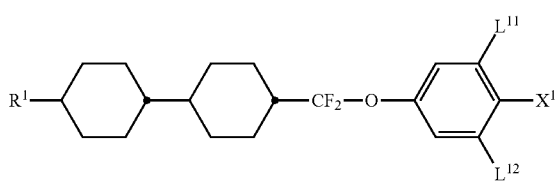

I-1a

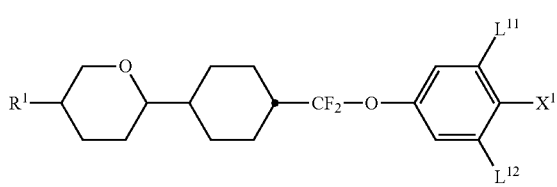

I-1b

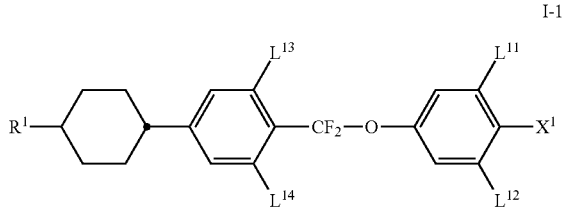

I-1c

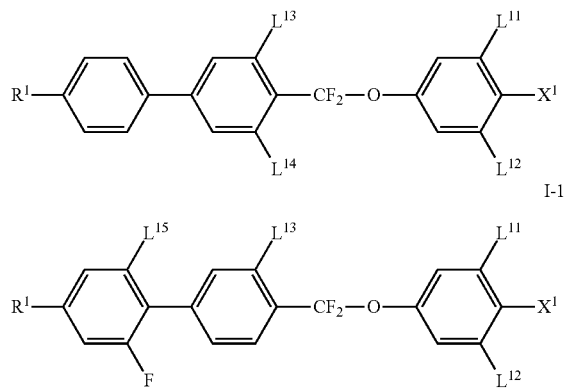

in which the parameters have the respective meanings indicated above, and $L^{13}$ to $L^{15}$, independently of one another and of the other parameters, denote H or F, and
preferably
in the formulae I-1a and I-1b
$L^{11}$ and $L^{12}$ both denote F,
in the formulae I-1c and I-1d
$L^{11}$ and $L^{12}$ both denote F and/or $L^{13}$ and $L^{14}$ both denote F, and
in formula I-1e
$L^{11}$, $L^{12}$ and $L^{15}$ denote F, and in each case the other parameters have the respective meanings given above.

The compounds selected from the group of compounds I-1a and I-1b are preferably used in a total concentration of 30% to 45%, more preferably 31% to 42%, more preferably 32% to 40%, and very preferably 35% to 38% of the mixture as a whole.

The compounds selected from the group of compounds I-1c are preferably used in a total concentration of 0% to 20%, more preferably 0.1% to 15% and most preferably 5% to 10% of the mixture as a whole.

The compounds selected from the group of compounds I-1d and I-1e are preferably used in a total concentration of 23% to 34%, more preferably 24% to 32%, more preferably 24% to 30%, and very preferably 26% to 29% of the mixture as a whole.

Especially preferred compounds of the formula I-1 are

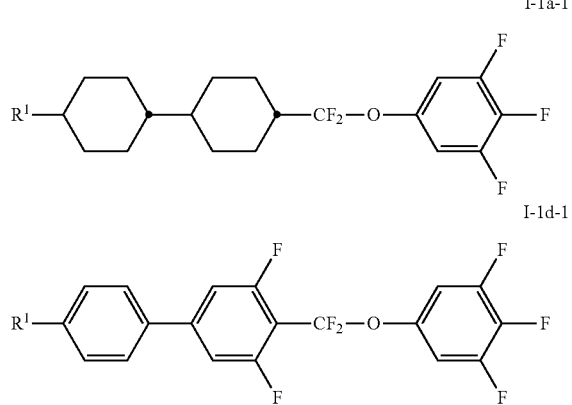

in which $R^1$ has the meaning indicated above.

The media preferably comprise one or more compounds of the formula I-2, which are preferably selected from the group of the compounds of the formulae I-2a to I-2c

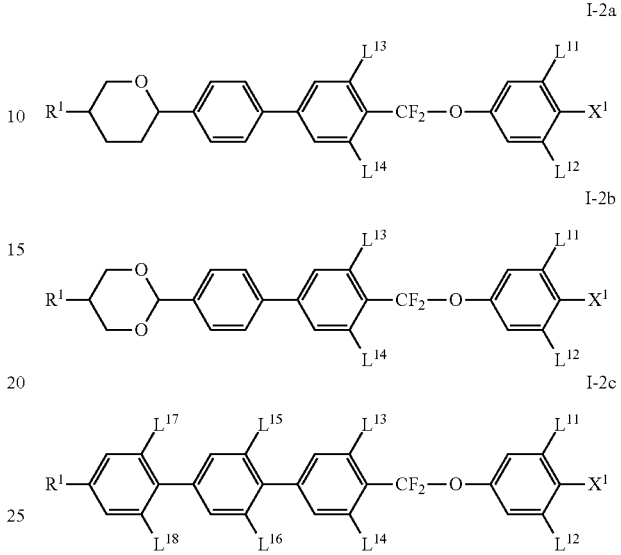

in which the parameters have the respective meanings indicated above, and $L^{15}$ to $L^{18}$, independently of one another, denote H or F, preferably $L^{17}$ and $L^{18}$ both denote H, particularly preferably $L^{16}$ denotes H, and the other parameters have the respective meanings given above.

The media according to the invention preferably comprise one or more compounds selected from the group of the compounds of the formulae I-2a to I-2c in which $L^{11}$ and $L^{12}$ both denote F and/or $L^{13}$ and $L^{14}$ both denote F, and the other parameters have the respective meanings given above.

In a preferred embodiment, the media according to the invention comprise one or more compounds selected from the group of the compounds of the formulae I-2a to I-2c in which $L^{11}$, $L^{12}$, $L^{13}$ and $L^{14}$ all denote F, and the other parameters have the respective meanings given above.

The compounds selected from the group of compounds I-2a and I-2b are preferably used in a total concentration of 0% to 12%, more preferably 0.1% to 11% and most preferably 1% to 10%.

The compounds selected from the group of compounds I-2c are preferably used in a total concentration of 4% to 12%, more preferably 5% to 11%, and very preferably 6% to 10% of the mixture as a whole.

Especially preferred compounds of the formula I-2 are the compounds of the following formula I-2c-1

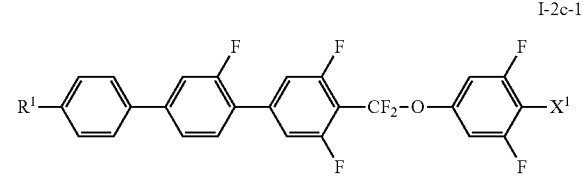

in which $R^1$ and $X^1$ have the meanings indicated above, and $X^1$ preferably denotes F.

The media according to the invention preferably comprise one or more compounds of the formula II-2, preferably selected from the group of the compounds of the formulae II-2a to III-2e II-2a
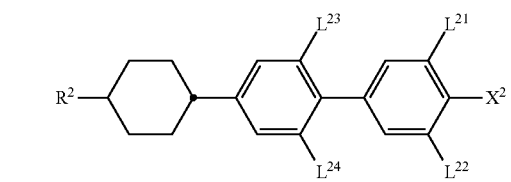

II2-b
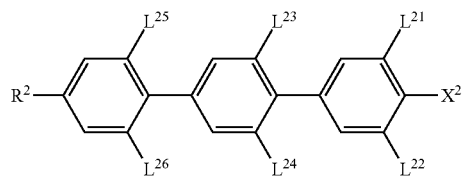

II-2c
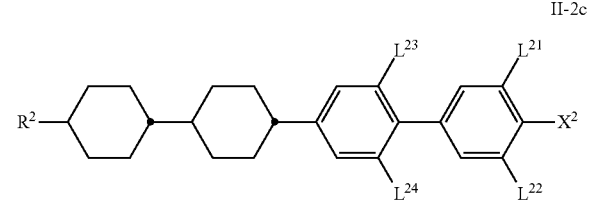

II-2d
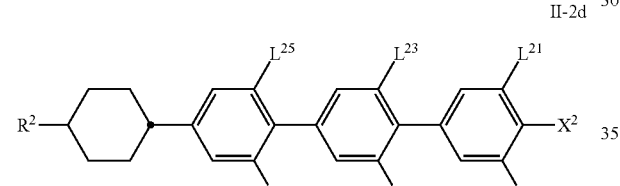

II-2e
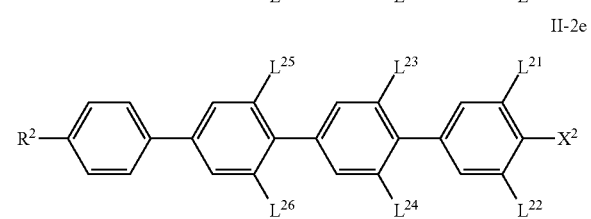

in which the parameters have the meaning given above and preferably in which the parameters have the respective meanings indicated above, and the parameters $L^{23}$, $L^{24}$, $L^{25}$ and $L^{26}$, independently of one another and of the other parameters, denote H or F.

The media according to the invention preferably comprise one or more compounds of the formula II-2d, preferably selected from the group of the compounds of the formulae II-2d-1 and II-2d-2, particularly preferably of the formula II-2d-2

II-2d-1
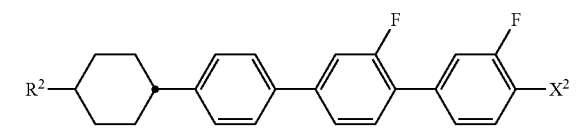

II-2d-2
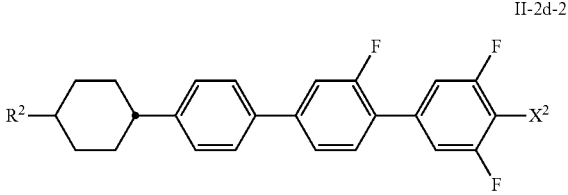

in which the parameters have the meaning given above, and $X^2$ preferably denotes F or $OCF_3$.

The media according to the invention preferably comprise one or more compounds of the formula II-2e, preferably selected from the group of the compounds of the formulae II-2e-1 and III-2e-2, particularly preferably of the formula II-2e-1

II-2e-1
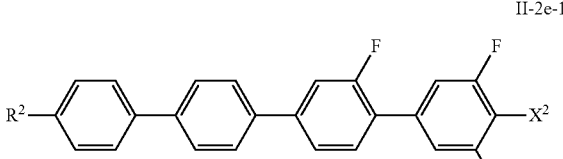

II-2e-2
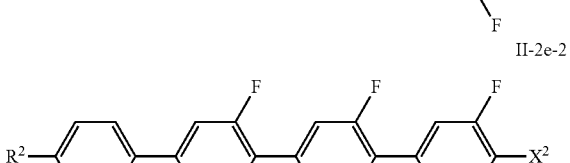

in which the parameters have the meaning given above and $X^2$ preferably denotes F.

The liquid-crystalline media according to the present invention preferably comprise a dielectrically neutral component. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises one or more dielectrically neutral compounds, more preferably predominantly consists of, even more preferably essentially consists of and very preferably entirely consists of dielectrically neutral compounds of the formula III having a dielectric anisotropy in the range from −1.5 to 3.

The dielectrically neutral component preferably comprises one or more compounds selected from the group of the compounds of the formulae III-1 to III-8

III-1
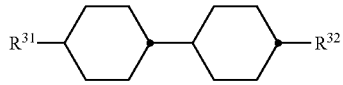

III-2
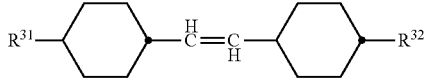

-continued

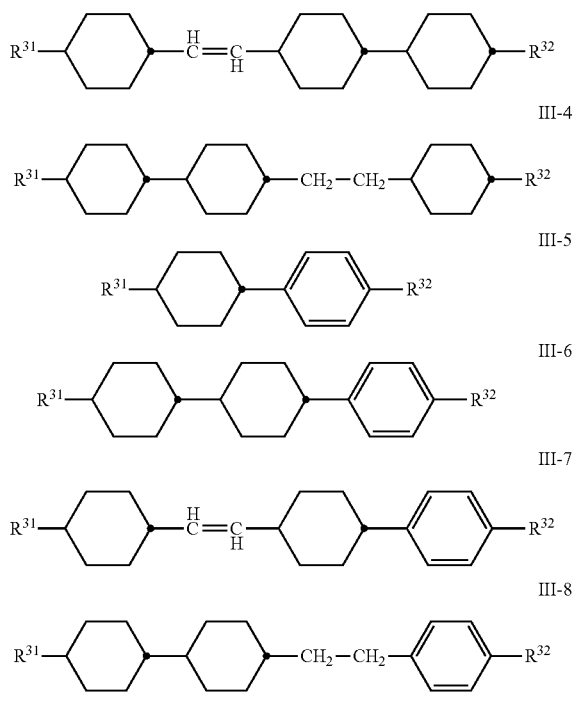

in which R³¹ and R³² have the respective meanings indicated above under formula III, and in formulae III-1, III-6 and III-7 R³¹ preferably denotes alkyl or alkenyl, preferably alkenyl, and R³² preferably denotes alkyl or alkenyl, preferably alkyl. In formula III-2 R³¹ and R³² preferably denote alkyl. In formula III-5 R³¹ preferably denotes alkyl or alkenyl, more preferably alkyl, and R³² preferably denotes alkyl, alkenyl or alkoxy, more preferably alkenyl or alkoxy, and in formulae III-4 and III-8 R³¹ preferably denotes alkyl and R³² preferably denotes alkyl or alkoxy, more preferably alkoxy.

The dielectrically neutral component preferably comprises one or more compounds selected from the group of the compounds of the formulae III-1, III-5, III-6 and III-7, preferably one or more compounds of the formula III-1 and one or more compounds selected from the group of the formulae III-5 and III-6, more preferably one or more compounds of each of the formulae III-1, III-5 and III-6 and very preferably one or more compounds of each of the formulae III-1, III-5, III-6 and III-7.

In a preferred embodiment, the media according to the invention comprise one or more compounds of the formula III-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

The liquid-crystalline media according to the present invention preferably comprise one or more compounds of the formula IV

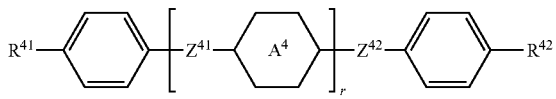

in which
R⁴¹ and R⁴², independently of one another, have the meaning indicated for R¹ under formula I above, preferably R⁴¹ denotes alkyl and R⁴² denotes alkyl or alkenyl,

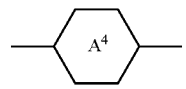

if it occurs twice in each case independently of one another on each occurrence, denotes

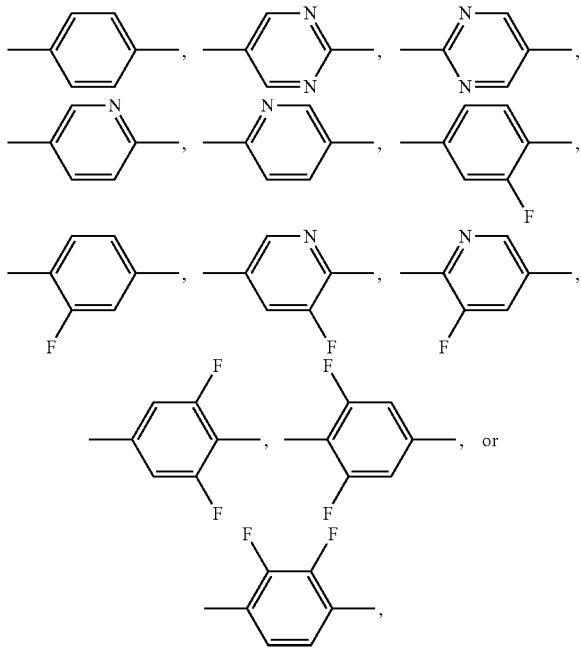

preferably one or more of

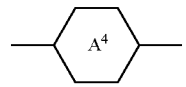

denote

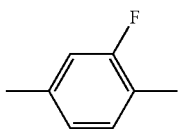

Z⁴¹ and Z⁴², independently of one another and, if Z⁴¹ occurs twice, also these independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond, and r denotes 0, 1 or 2, preferably 0 or 1, particularly preferably 1.

The compounds of the formula IV are preferably dielectrically neutral compounds having a dielectric anisotropy in the range from −1.5 to 3.

The media according to the invention preferably comprise one or more compounds selected from the group of the compounds of the formulae IV-1 and IV-2

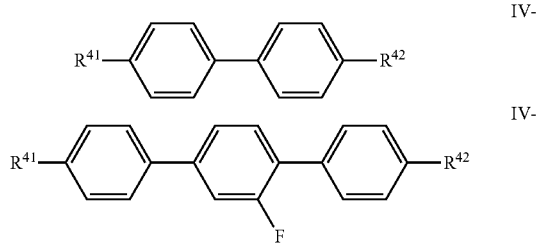

in which R$^{41}$ and R$^{42}$ have the respective meanings indicated above under formula IV, and R$^{41}$ preferably denotes alkyl, and in formula IV-1 R$^{42}$ preferably denotes alkenyl, preferably —(CH$_2$)$_2$—CH=CH—CH$_3$, and in formula IV-2 R$^{42}$ preferably denotes alkyl or alkenyl, preferably —CH=CH$_2$, —(CH$_2$)$_2$—CH=CH$_2$ or —(CH$_2$)$_2$—CH=CH—CH$_3$.

The media according to the invention preferably comprise one or more compounds selected from the group of the compounds of the formulae IV-1 and IV-2 in which R$^{41}$ preferably denotes n-alkyl, and in formula IV-1 R$^{42}$ preferably denotes alkenyl, and in formula IV-2 R$^{42}$ preferably denotes n-alkyl.

In a preferred embodiment, the media according to the invention comprise one or more compounds of the formula IV-2, more preferably of the sub-formulae PGP-n-m, PGP-n-V, PGP-n-2Vm and PGP-n-2V, and thereof, even more preferably of the sub-formulae PGP-3-m, PGP-n-2V and PGP-n-V1 and thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

The liquid-crystalline media according to the present invention preferably comprise one or more compounds selected from the group of the compounds of the formulae I to IV, more preferably of the formulae I and II and III and/or IV, and most preferably of the formulae I and II and III and IV. They particularly preferably predominantly consist of, even more preferably essentially consist of and very preferably entirely consist of these compounds.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly consist of" means that the entity in question comprises 55% or more, preferably 60% or more and very preferably 70% or more of the component or components or compound or compounds indicated.

In this connection, "essentially consist of" means that the entity in question comprises 80% or more, preferably 90% or more and very preferably 95% or more of the component or components or compound or compounds indicated.

In this connection, "virtually completely consist of" or "entirely consist of" means that the entity in question comprises 98% or more, preferably 99% or more and very preferably 100% of the component or components or compound or compounds indicated.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 70° C. or more, more preferably 75° C. or more, particularly preferably 80° C. or more and very particularly preferably 85° C. or more.

The nematic phase of the media according to the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The Δε of the liquid-crystal medium according to the invention, at 1 kHz and 20° C., is preferably 2 or more, more preferably 3 or more, even more preferably 4 or more and very preferably 6 or more. Δε is preferably 30 or less, Δε is particularly preferably 20 or less.

The Δn of the liquid-crystal media according to the present invention, at 589 nm (Na$^D$) and 20° C., is preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a preferred embodiment of the present application, the Δn of the liquid-crystal media according to the present invention is preferably 0.100 or more to 0.140 or less, more preferably in the range from 0.110 or more to 0.130 or less and very particularly preferably in the range from 0.115 or more to 0.125 or less, while Δε is preferably in the range from 10 or more to 30 or less, preferably in the range from 15 or more to 25 or less and particularly preferably in the range from 17 or more to 23 or less.

In accordance with the present invention, the compounds of the formula I together are preferably used in the media in a total concentration of 60% to 90%, more preferably 61% to 85%, more preferably 62% to 80%, and very preferably 65% to 75% of the mixture as a whole.

The compounds selected from the group of the formula II are preferably used in a total concentration of 5% to 15%, more preferably 7% to 13% and very preferably 8% to 12% of the mixture as a whole.

The compounds selected from the group of the formulae I and II are preferably used in a total concentration of 65% to 95%, more preferably 68% to 93%, even more preferably 72% to 90% and very preferably 75% to 85% of the mixture as a whole.

The compounds of the formula III are preferably used in a total concentration of 5% to 25%, more preferably 7% to 22%, and very preferably 10% to 20% of the mixture as a whole.

The compounds of the formula IV are preferably used in a total concentration of 0% to 15%, more preferably 1% to 12% and very preferably 5% to 10% of the mixture as a whole.

The media according to the invention may optionally comprise further liquid-crystal compounds in order to adjust the physical properties. Such compounds are known to the person skilled in the art. Their concentration in the media according to the present invention is preferably 0% to 15%, more preferably 0.1% to 10% and very preferably 1% to 8%.

In a preferred embodiment, the concentration of the compound of the formula CC-4-V in the media according to the invention can be 10% to 20%, particularly preferably 12% to 17%.

The liquid-crystal media preferably comprise in total 50% to 100%, more preferably 70% to 100% and very preferably 80% to 100% and in particular 90% to 100% of the compounds of the formulae I to IV, preferably selected from the group of the compounds of the formulae I, II and III, particularly preferably of the formulae I to IV.

In the present application, the expression dielectrically positive describes compounds or components where $\Delta\varepsilon > 3.0$, dielectrically neutral describes those where $-1.5 \leq \Delta\varepsilon 3.0$ and dielectrically negative describes those where $\Delta\varepsilon < -1.5$. Ac is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon\| - \varepsilon\perp)$, while $\varepsilon_{av.}$ is $(\varepsilon\| + 2\varepsilon\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon\|$) and polyimide AL-1054 from Japan Synthetic Rubber, Japan, for homogeneous orientation ($\varepsilon\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs, and especially in VA displays or TBA mode displays.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms.

In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups.

Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C |  |
| P | 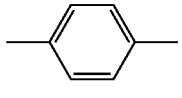 |
| D | 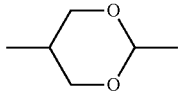 |
| DI | 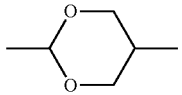 |
| A | 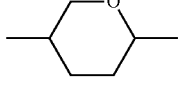 |
| AI | 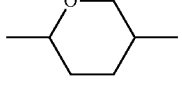 |
| G | 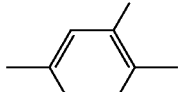 |
| GI | 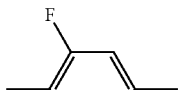 |
| U | 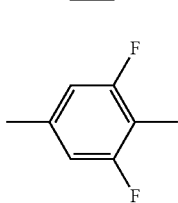 |

TABLE A-continued

| Ring elements | |
|---|---|
| UI | 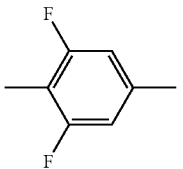 |
| Y | 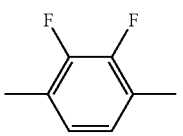 |
| M | 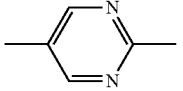 |
| MI | 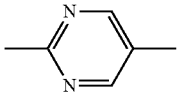 |
| N | 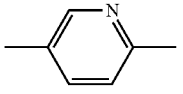 |
| NI | 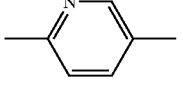 |
| Np | 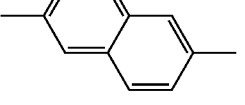 |
| dH | 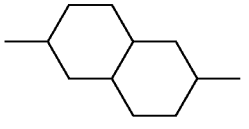 |
| N3f | 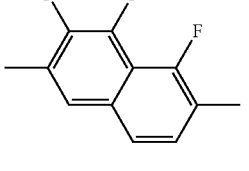 |
| N3fI | 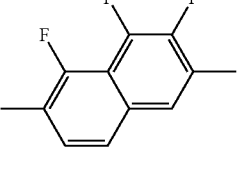 |
| tH | 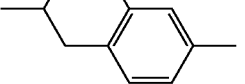 |

TABLE A-continued

| Ring elements | |
|---|---|
| tHI | 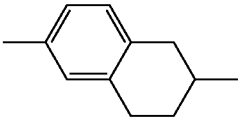 |
| tH2f | 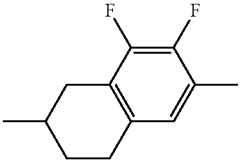 |
| tH2fI | 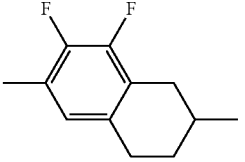 |
| K | 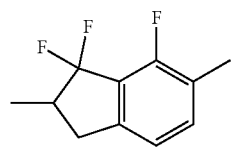 |
| KI | 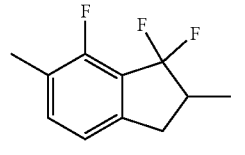 |
| L | 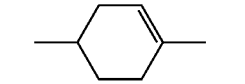 |
| LI |  |
| F | 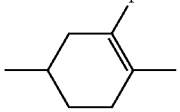 |
| FI | 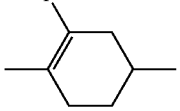 |
| Nf | 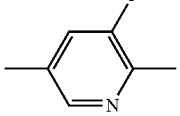 |
| NfI | 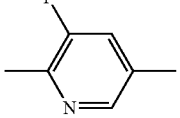 |

TABLE B

| Linking groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

| End groups | | | |
|---|---|---|---|
| Left-hand side | | Right-hand side | |
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

TABLE C-continued

| End groups | | | |
|---|---|---|---|
| Left-hand side | | Right-hand side | |
| Use together with one another and with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures $C_nH_{2n+1}$—⟨cyclohexyl⟩—⟨cyclohexyl⟩—$C_mH_{2m+1}$

CC-n-m $C_nH_{2n+1}$—⟨cyclohexyl⟩—⟨cyclohexyl⟩—O—$C_mH_{2m+1}$

CC-n-Om $C_nH_{2n+1}$—⟨cyclohexyl⟩—⟨cyclohexyl⟩—CH=$CH_2$

CC-n-V $C_nH_{2n+1}$—⟨cyclohexyl⟩—⟨cyclohexyl⟩—CH=CH—$C_mH_{2m+1}$

CC-n-Vm $C_nH_{2n+1}$—⟨cyclohexyl⟩—⟨cyclohexyl⟩—$(CH_2)_m$—CH=$CH_2$

CC-n-mV $C_nH_{2n+1}$—⟨cyclohexyl⟩—⟨cyclohexyl⟩—$(CH_2)_m$—CH=CH—$C_lH_{2l+1}$

CC-n-mVl $H_2C$=CH—⟨cyclohexyl⟩—⟨cyclohexyl⟩—CH=$CH_2$

CC-V-V

TABLE D-continued

| Illustrative structures |
|---|

$CH_2\!=\!CH$—⬡—⬡—$(CH_2)_m\!-\!CH\!=\!CH_2$

CC-V-mV $CH_2\!=\!CH$—⬡—⬡—$CH\!=\!CH\!-\!C_mH_{2m+1}$

CC-V-Vm $CH_2\!=\!CH\!-\!(CH_2)_n$—⬡—⬡—$(CH_2)_m\!-\!CH\!=\!CH_2$

CC-Vn-mV $C_nH_{2n+1}\!-\!CH\!=\!CH$—⬡—⬡—$(CH_2)_m\!-\!CH\!=\!CH_2$

CC-nV-mV $C_nH_{2n+1}\!-\!CH\!=\!CH$—⬡—⬡—$CH\!=\!CH\!-\!C_mH_{2m+1}$

CC-nV-Vm $C_nH_{2n+1}$—⬡—⌬—$C_mH_{2m+1}$

CP-n-m $C_nH_{2n+1}O$—⬡—⌬—$C_mH_{2m+1}$

CP-nO-m $C_nH_{2n+1}$—⬡—⌬—$OC_mH_{2m+1}$

CP-n-Om $CH_2\!=\!CH$—⬡—⌬—$C_mH_{2m+1}$

CP-V-m $CH_2\!=\!CH\!-\!(CH_2)_n$—⬡—⌬—$C_mH_{2m+1}$

CP-Vn-m $C_nH_{2n+1}\!-\!CH\!=\!CH$—⬡—⌬—$C_mH_{2m+1}$

CP-nV-m

TABLE D-continued
| Illustrative structures |
|---|
| 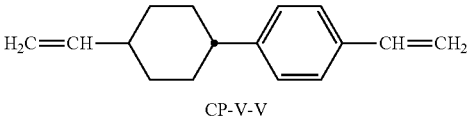 CP-V-V |
| 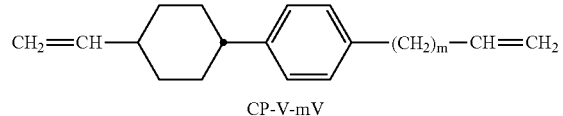 CP-V-mV |
| 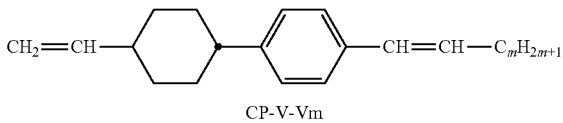 CP-V-Vm |
| 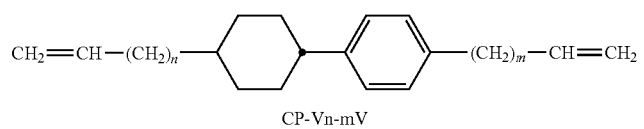 CP-Vn-mV |
| 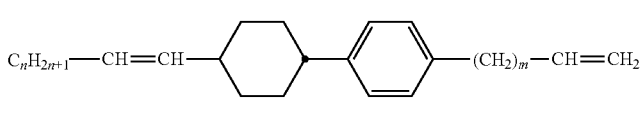 CP-nV-mV |
| 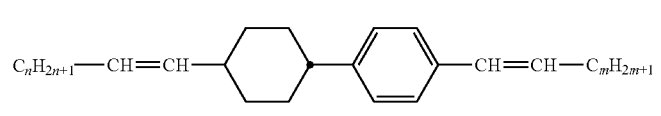 CP-nV-Vm |
| 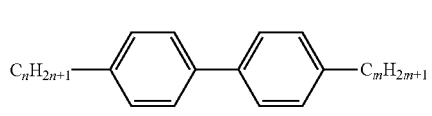 PP-n-m |
| 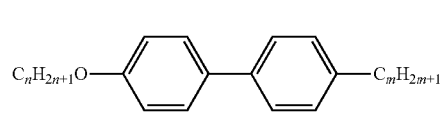 PP-nO-m |
| 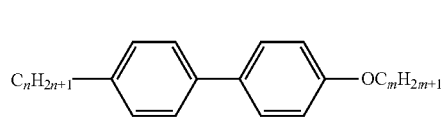 PP-n-Om |
| 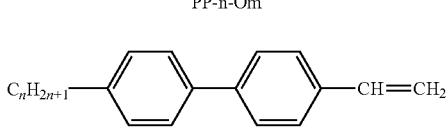 PP-n-V |
| 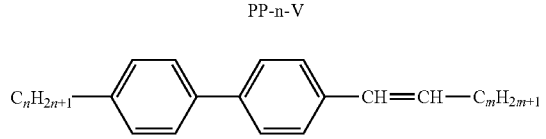 PP-n-Vm |

TABLE D-continued

Illustrative structures $C_nH_{2n+1}$—⟨phenyl⟩—⟨phenyl⟩—$(C_mH_{2m})$—CH=CH$_2$

PP-n-mV $C_nH_{2n+1}$—⟨phenyl⟩—⟨phenyl⟩—$(CH_2)_m$—CH=CH—$C_lH_{2l+1}$

PP-n-mVI $C_nH_{2n+1}$—⟨cyclohexyl⟩—⟨cyclohexyl⟩—⟨phenyl⟩—$C_mH_{2m+1}$

CCP-n-m $C_nH_{2n+1}$O—⟨cyclohexyl⟩—⟨cyclohexyl⟩—⟨phenyl⟩—$C_mH_{2m+1}$

CCP-nO-m $C_nH_{2n+1}$—⟨cyclohexyl⟩—⟨cyclohexyl⟩—⟨phenyl⟩—O$C_mH_{2m+1}$

CCP-n-Om $C_nH_{2n+1}$—⟨cyclohexyl⟩—⟨cyclohexyl⟩—⟨phenyl⟩—CH=CH$_2$

CCP-n-V $C_nH_{2n+1}$—⟨cyclohexyl⟩—⟨cyclohexyl⟩—⟨phenyl⟩—CH=CH—$C_mH_{2m+1}$

CCP-n-Vm $C_nH_{2n+1}$—⟨cyclohexyl⟩—⟨cyclohexyl⟩—⟨phenyl⟩—$(C_mH_{2m})$—CH=CH$_2$ CCP-n-mV $C_nH_{2n+1}$—⟨cyclohexyl⟩—⟨cyclohexyl⟩—⟨phenyl⟩—$(C_mH_{2m})$—CH=CH—$C_lH_{2l+1}$ CCP-n-mVI $H_2C$=CH—⟨cyclohexyl⟩—⟨cyclohexyl⟩—⟨phenyl⟩—$C_mH_{2m+1}$ CCP-V-m $C_nH_{2n+1}$—CH=CH—⟨cyclohexyl⟩—⟨cyclohexyl⟩—⟨phenyl⟩—$C_mH_{2m+1}$ CCP-nV-m TABLE D-continued Illustrative structures $CH_2=CH-(CH_2)_n$—[Cy]—[Cy]—[Ph]—$C_mH_{2m+1}$ CCP-Vn-m $C_nH_{2n+1}$—$CH=CH$—$(CH_2)_m$—[Cy]—[Cy]—[Ph]—$C_lH_{2l+1}$ CCP-nVm-I $C_nH_{2n+1}$—[Cy]—[Ph]—[Ph]—$C_mH_{2m+1}$ CPP-n-m $C_nH_{2n+1}$—[Cy]—[Ph]—[Ph-F]—$C_mH_{2m+1}$ CPG-n-m $C_nH_{2n+1}$—[Cy]—[Ph-F]—[Ph]—$C_mH_{2m+1}$ CGP-n-m $C_nH_{2n+1}O$—[Cy]—[Ph]—[Ph]—$C_mH_{2m+1}$ CPP-nO-m $C_nH_{2n+1}$—[Cy]—[Ph]—[Ph]—$OC_mH_{2m+1}$ CPP-n-Om $H_2C=CH$—[Cy]—[Ph]—[Ph]—$C_mH_{2m+1}$ CPP-V-m $C_nH_{2n+1}$—$CH=CH$—[Cy]—[Ph]—[Ph]—$C_mH_{2m+1}$ CPP-nV-m $CH_2=CH$—$(C_nH_{2n})$—[Cy]—[Ph]—[Ph]—$C_mH_{2m+1}$ CPP-Vn-m $C_nH_{2n+1}$—$CH=CH$—$(C_mH_{2m})$—[Cy]—[Ph]—[Ph]—$C_lH_{2l+1}$ CPP-nVm-I TABLE D-continued
Illustrative structures
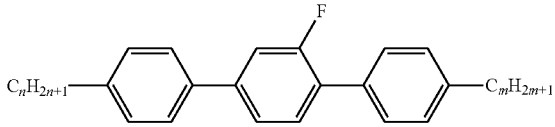
PGP-n-m
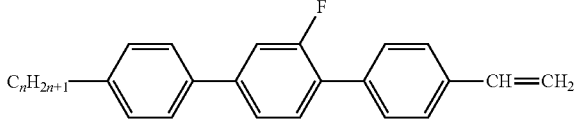
PGP-n-V
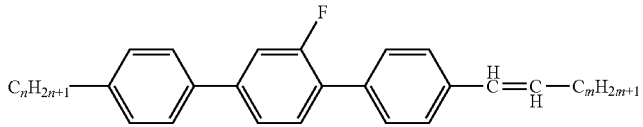
PGP-n-Vm
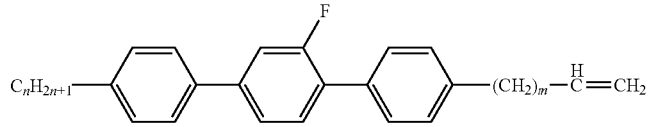
PGP-n-mV
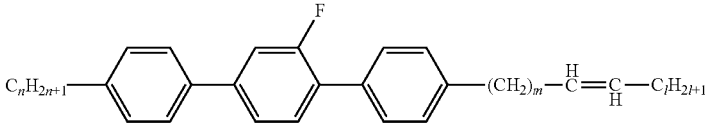
PGP-n-mVl
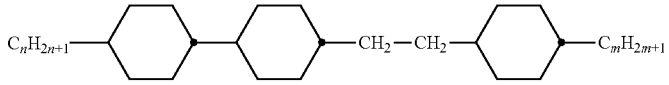
CCEC-n-m
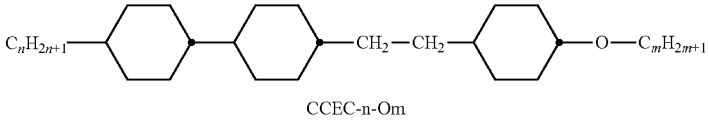
CCEC-n-Om
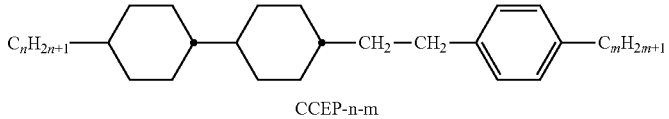
CCEP-n-m
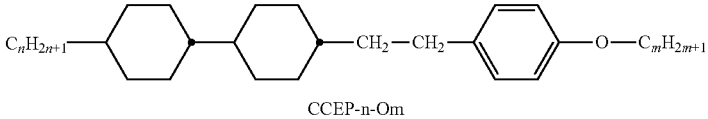
CCEP-n-Om
CPPC-n-m TABLE D-continued
Illustrative structures
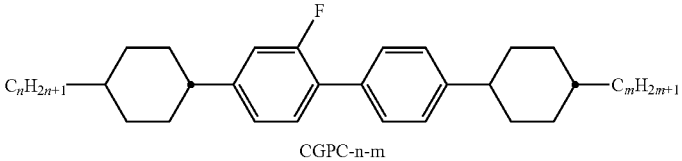
CGPC-n-m
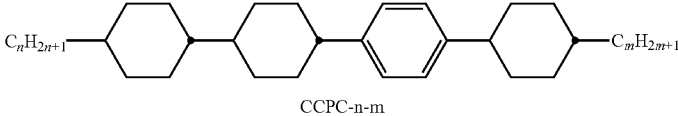
CCPC-n-m
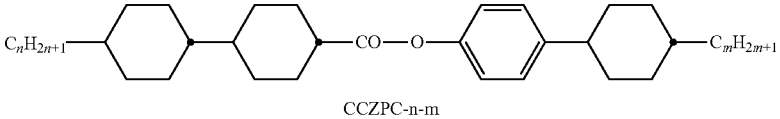
CCZPC-n-m
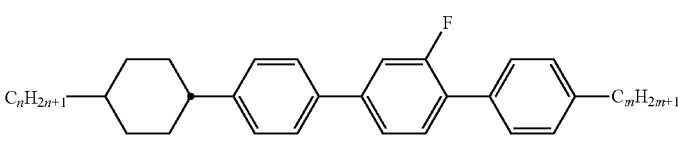
CPGP-n-m
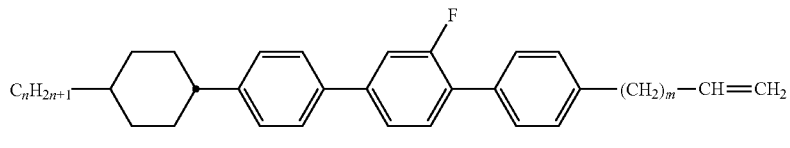
CPGP-n-mV
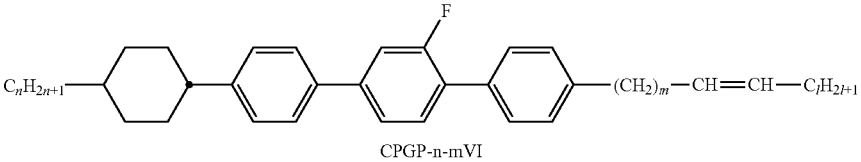
CPGP-n-mVI
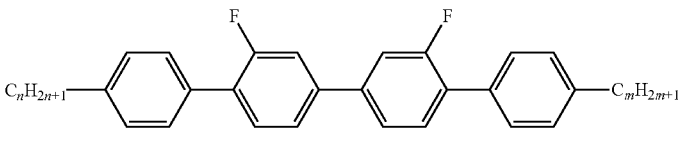
PGIGP-n-m
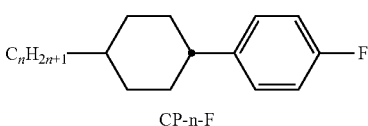
CP-n-F
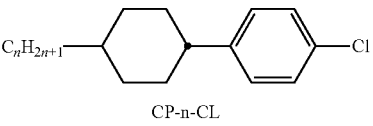
CP-n-CL TABLE D-continued
Illustrative structures
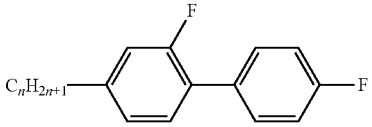
GP-n-F
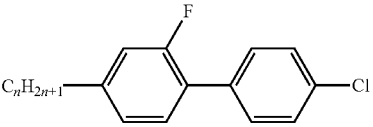
GP-n-CL
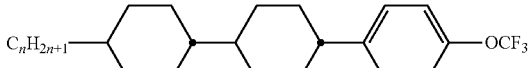
CCP-n-OT
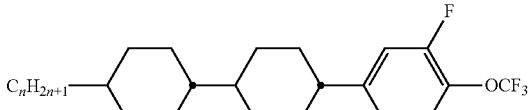
CCG-n-OT
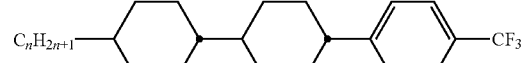
CCP-n-T
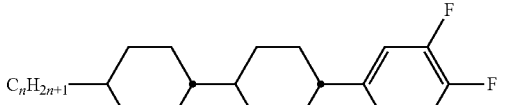
CCG-n-F
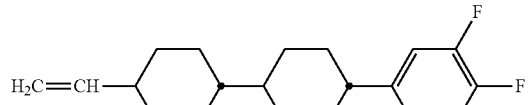
CCG-V-F
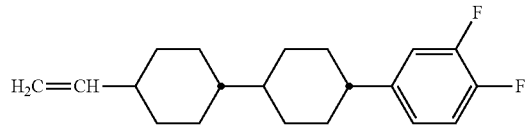
CCG-V-F
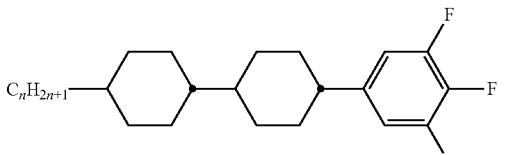
CCU-n-F TABLE D-continued
Illustrative structures
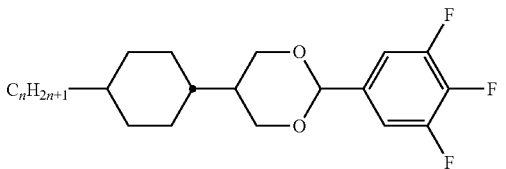
CDU-n-F
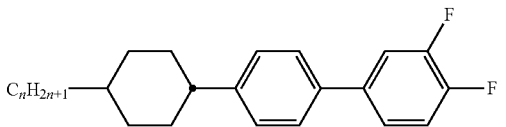
CPG-n-F
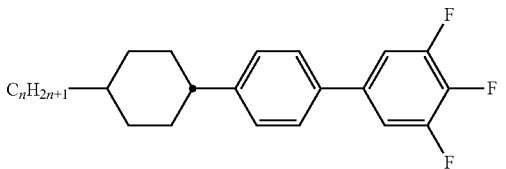
CPU-n-F
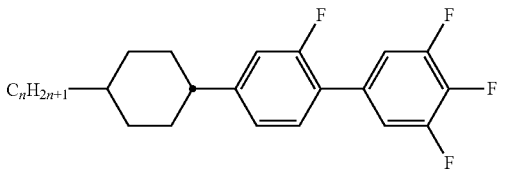
CGU-n-F
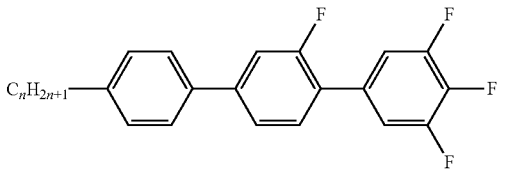
PGU-n-F
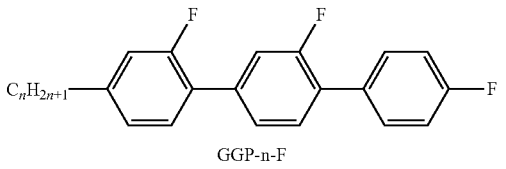
GGP-n-F
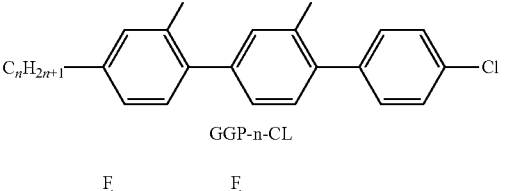
GGP-n-CL
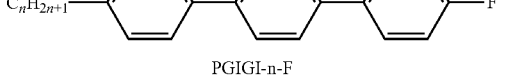
PGIGI-n-F TABLE D-continued
| Illustrative structures |
|---|
| 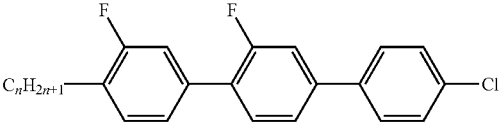 PGIGI-n-CL |
| 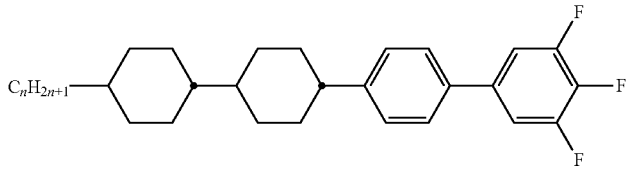 CCPU-n-F |
| 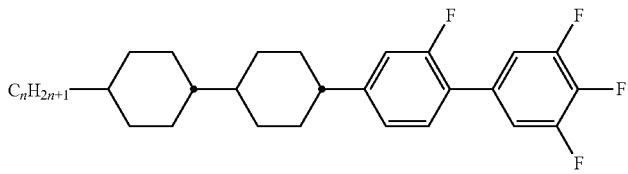 CCGU-n-F |
| 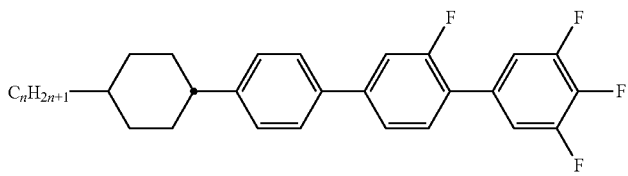 CPGU-n-F |
| 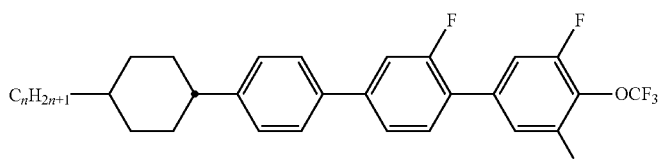 CPGU-n-OT |
| 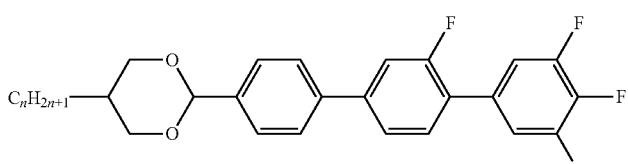 DPGU-n-F |
| 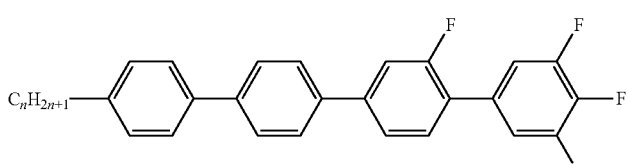 PPGU-n-F |

TABLE D-continued
| Illustrative structures |
|---|
| 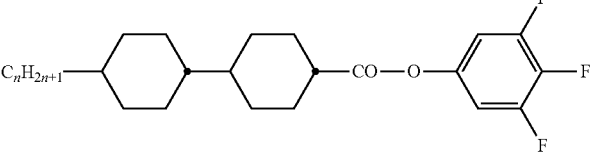 CCZU-n-F |
| 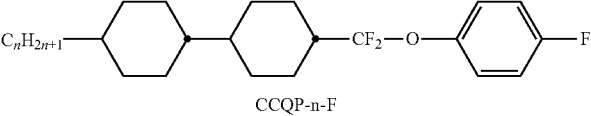 CCQP-n-F |
| 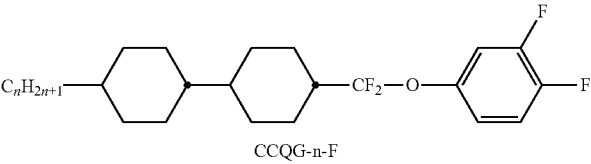 CCQG-n-F |
| 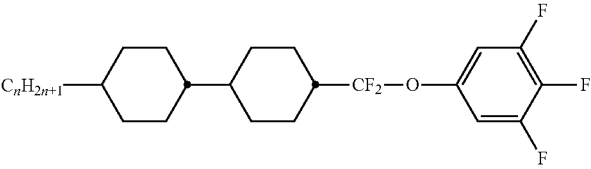 CCQU-n-F |
| 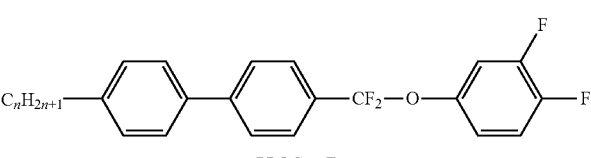 PPQG-n-F |
| 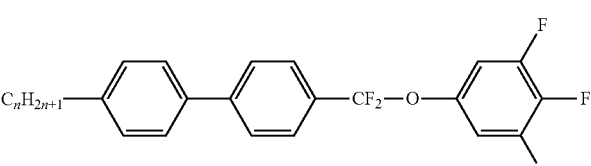 PPQU-n-F |
| 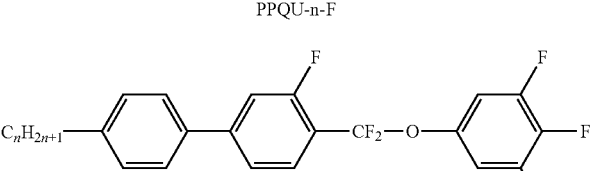 PGQU-n-F |
| 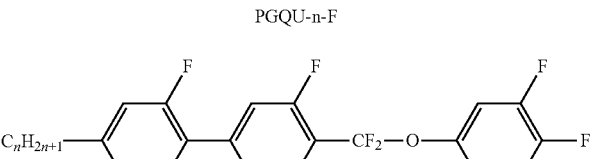 GGQU-n-F |

TABLE D-continued
Illustrative structures
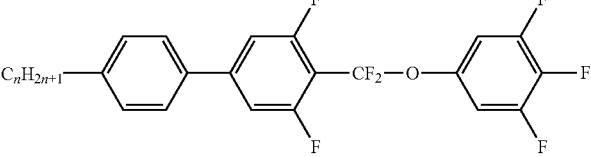
PUQU-n-F
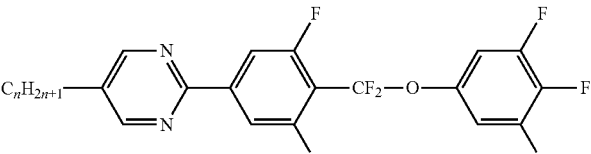
MUQU-n-F
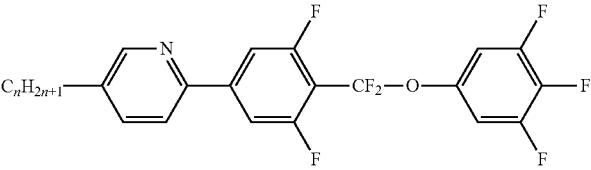
NUQU-n-F
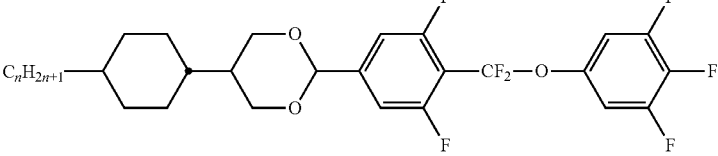
CDUQU-n-F
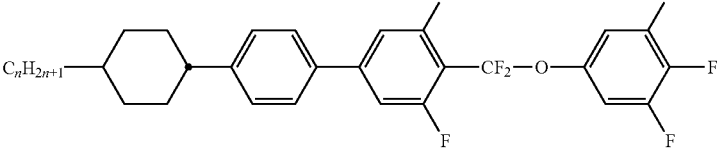
CPUQU-n-F
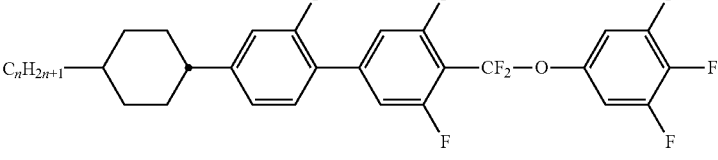
CGUQU-n-F
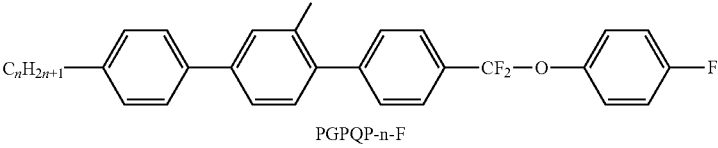
PGPQP-n-F

TABLE D-continued

Illustrative structures

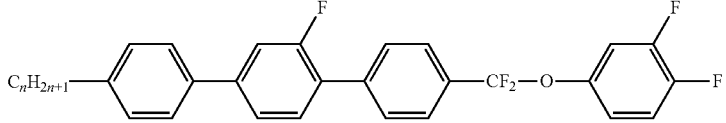

PGPQG-n-F

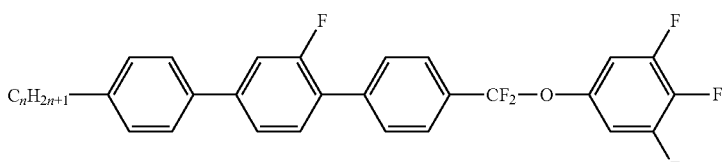

PGPQU-n-F

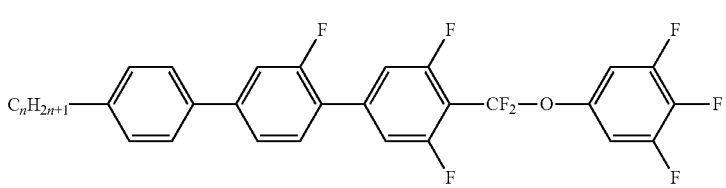

PGUQU-n-F

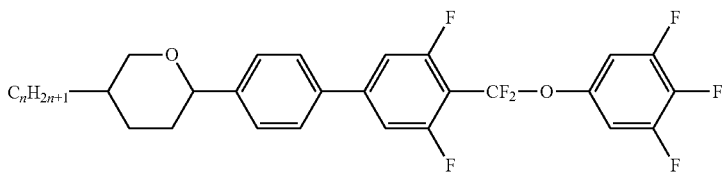

APUQU-n-F

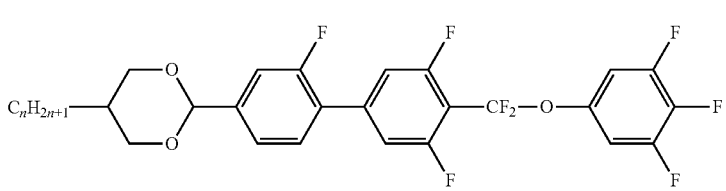

DGUQU-n-F in which n, m and l preferably, independently of one another, denote 1 to 7.

The following table, Table E, shows illustrative compounds which can be used as additional stabilisers in the mesogenic media according to the present invention.

Table E shows possible stabilisers which can be added to the LC media according to the invention.

(n here denotes an integer from 1 to 12, preferably 1, 2, 3, 4, 5, 6, 7 or 8, terminal methyl groups are not shown).

TABLE E

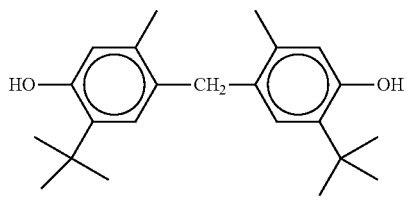

TABLE E-continued
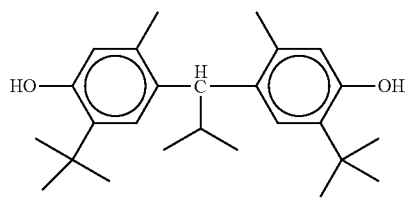
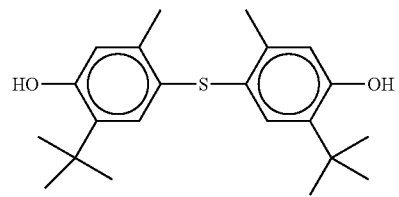
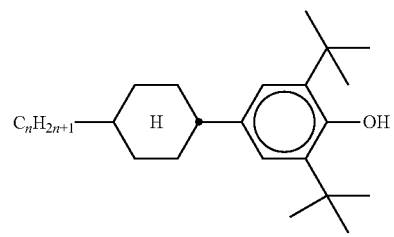
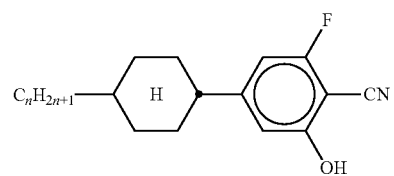
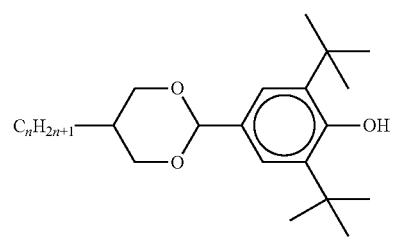
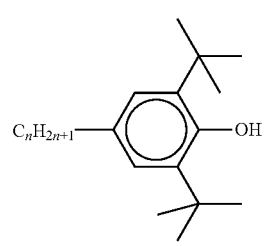
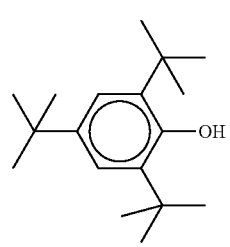

TABLE E-continued
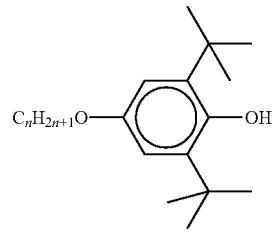
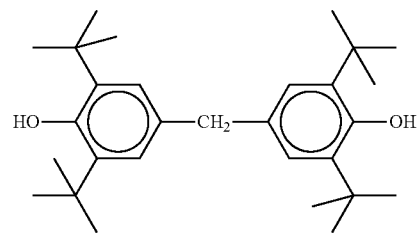
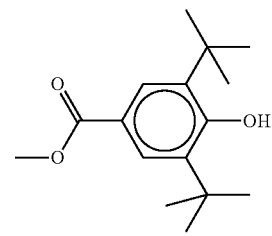
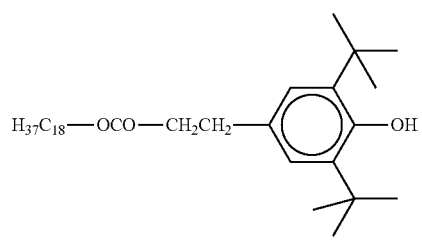
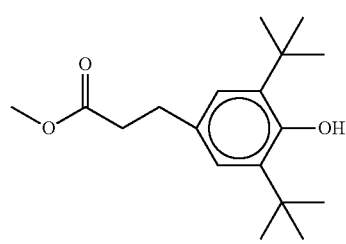
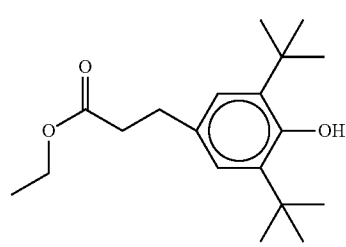

TABLE E-continued
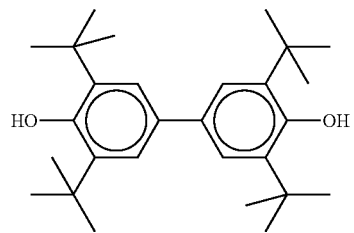
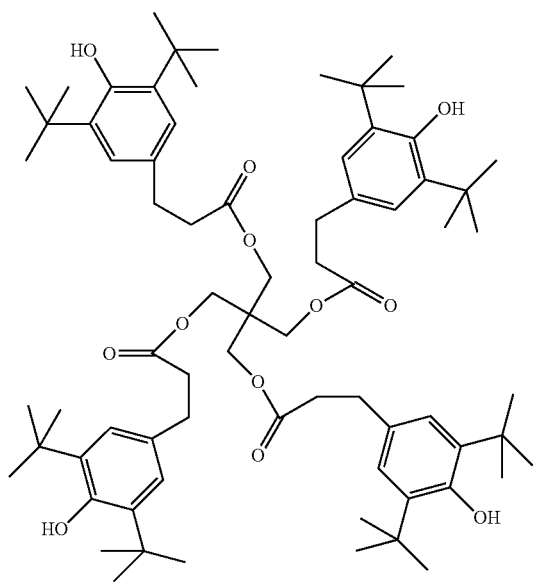 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
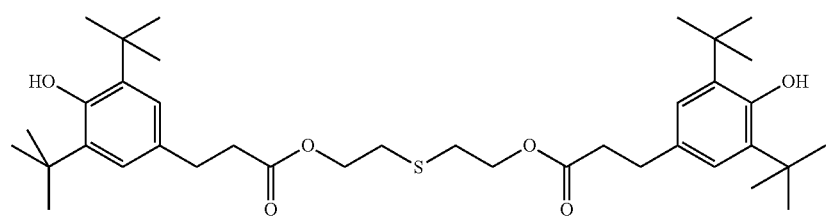 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
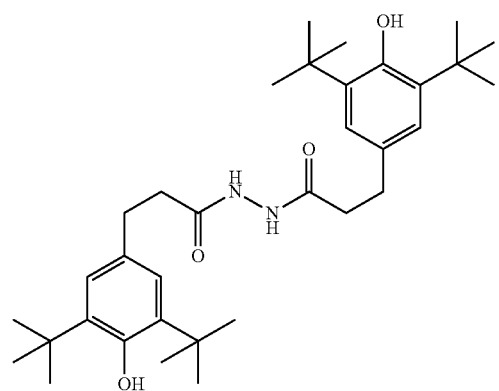 [SMILES: CC(C)(C)c1cc(CCC(=O)NNC(=O)CCc2cc(C(C)(C)C)c(O)c(C(C)(C)C)c2)cc(C(C)(C)C)c1O]

TABLE E-continued
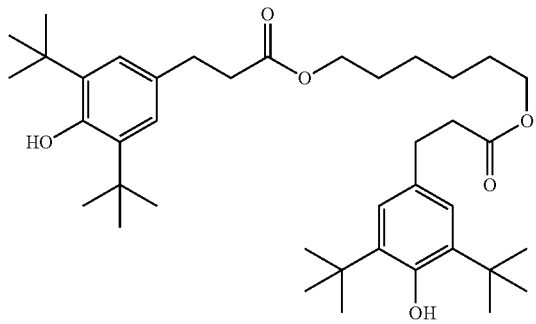 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
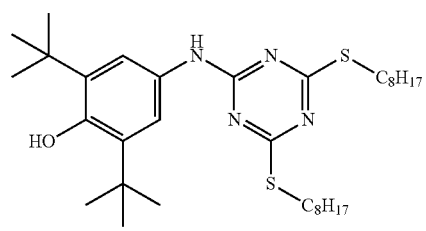
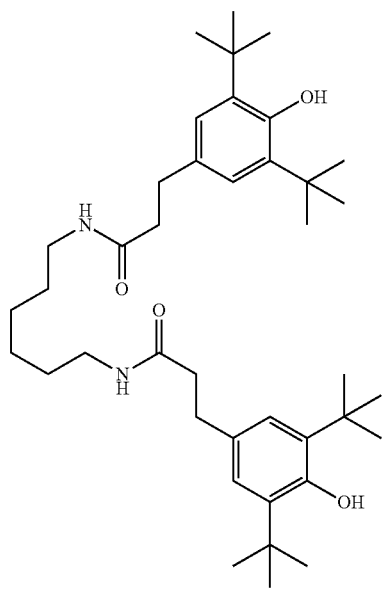 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
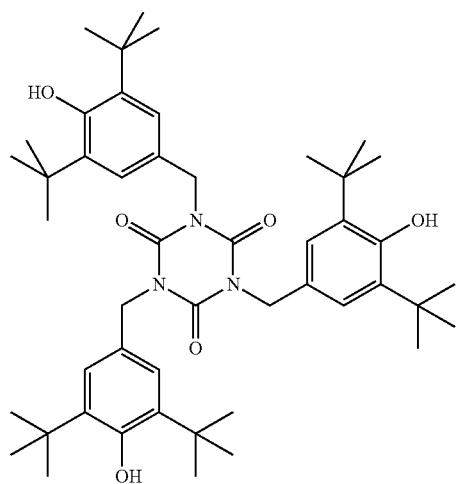 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued
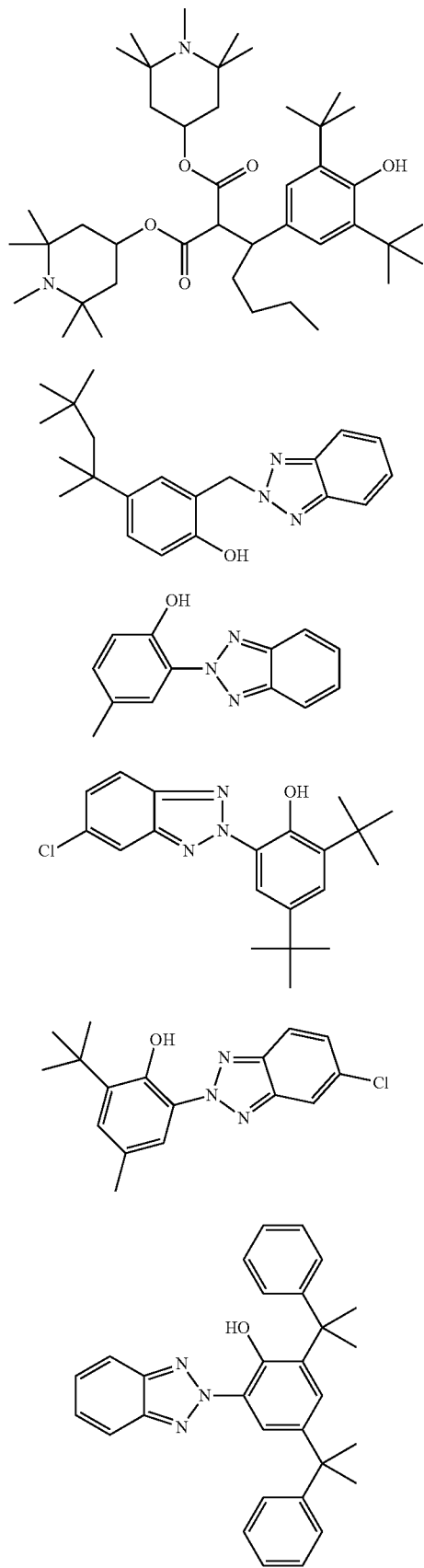

TABLE E-continued
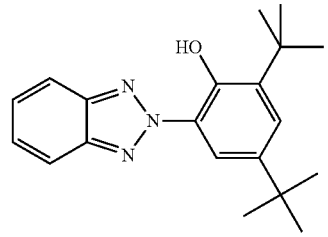 [SMILES: CC(C)(C)c1cc(-n2nc3ccccc3n2)c(O)c(C(C)(C)C)c1]
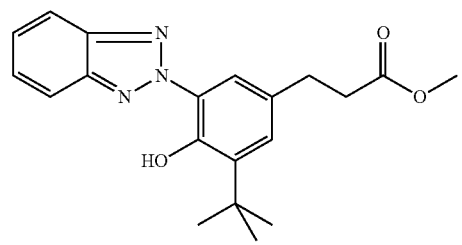 [SMILES: COC(=O)CCc1cc(-n2nc3ccccc3n2)c(O)c(C(C)(C)C)c1]
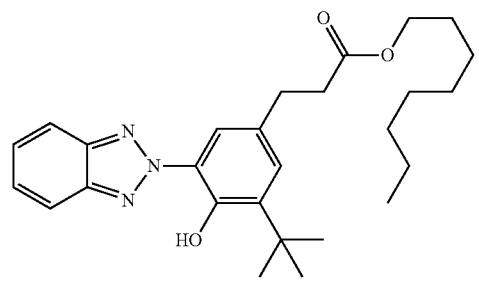 [SMILES: CCCCCCCCOC(=O)CCc1cc(-n2nc3ccccc3n2)c(O)c(C(C)(C)C)c1]
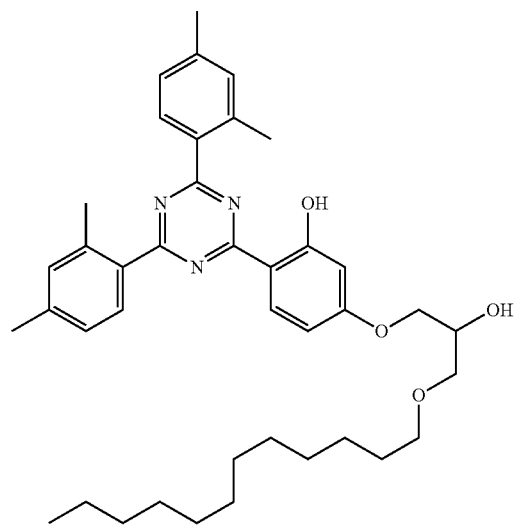 [SMILES: CCCCCCCCCCCCOCC(O)COc1ccc(-c2nc(-c3ccc(C)cc3C)nc(-c3ccc(C)cc3C)n2)c(O)c1]

TABLE E-continued
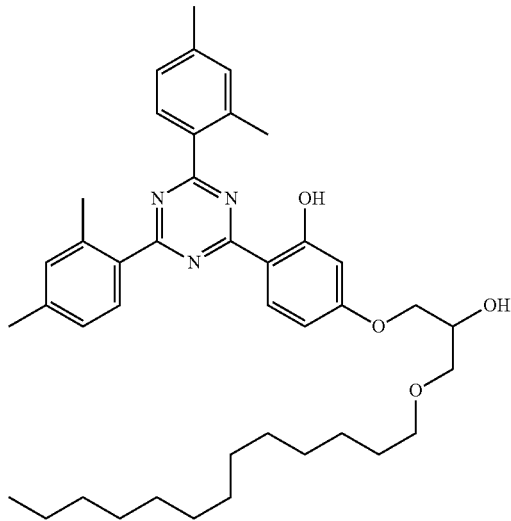 [SMILES: CCCCCCCCCCCCCOCC(O)COc1ccc(-c2nc(-c3ccc(C)cc3C)nc(-c3ccc(C)cc3C)n2)c(O)c1]
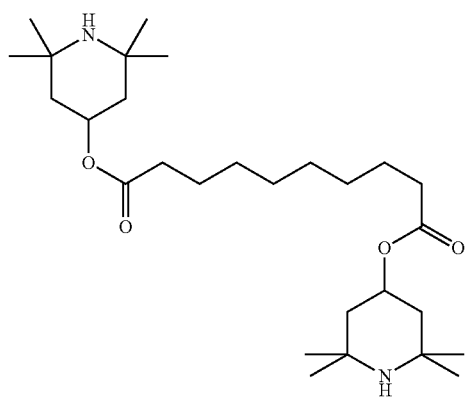
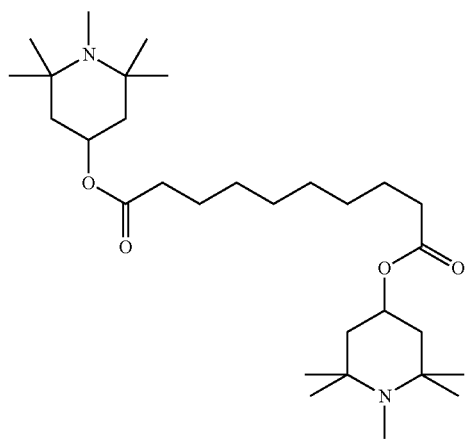

TABLE E-continued
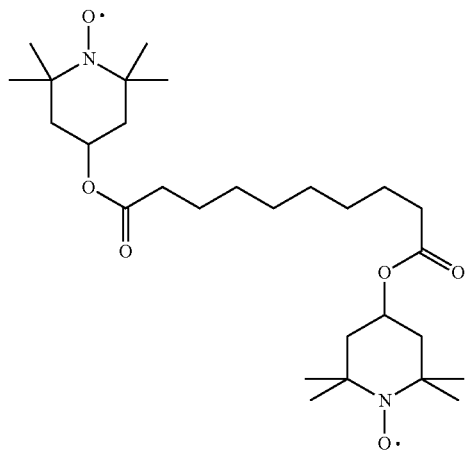
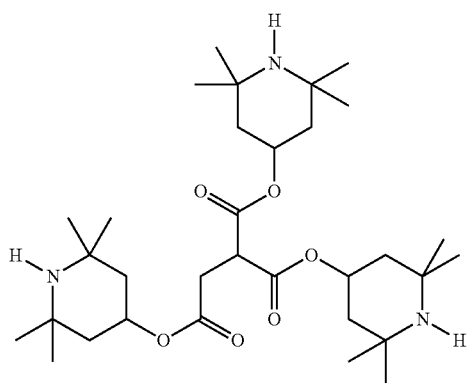 [SMILES: CC1(C)CC(OC(=O)CC(C(=O)OC2CC(C)(C)NC(C)(C)C2)C(=O)OC2CC(C)(C)NC(C)(C)C2)CC(C)(C)N1]
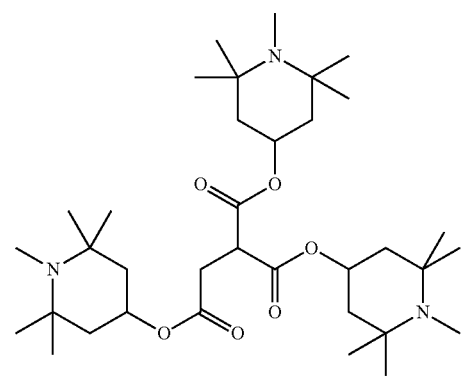
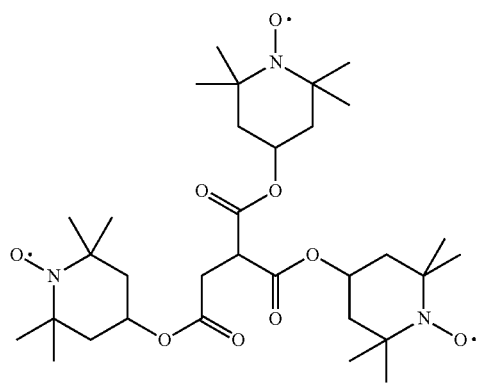

TABLE E-continued
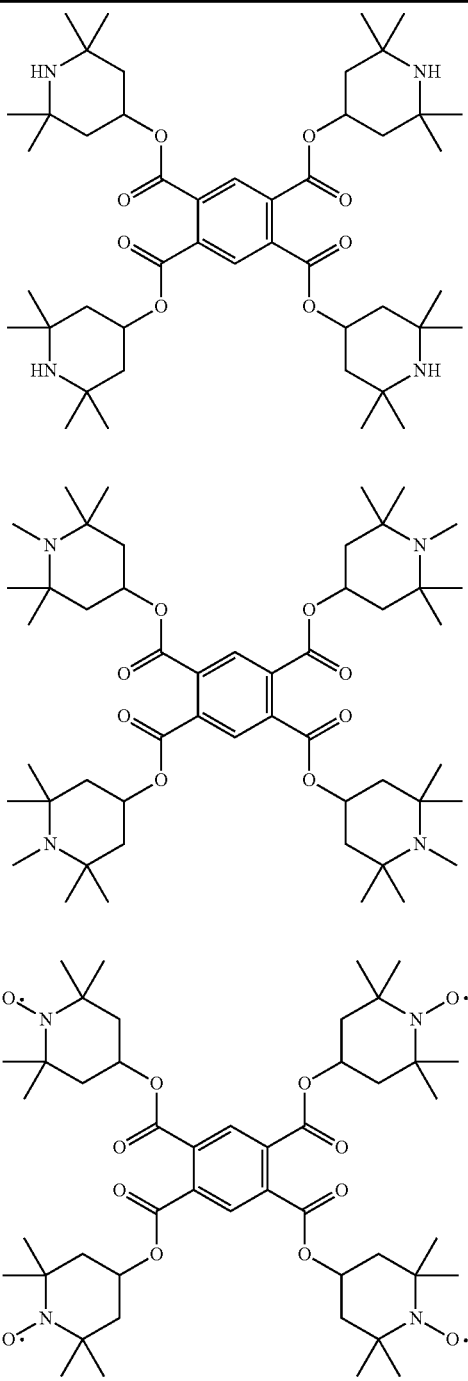
The LC media preferably comprise 0 to 10% by weight, in particular 1 ppm to 5% by weight, particularly preferably 1 ppm to 1% by weight, of stabilisers.
Table F below shows illustrative compounds which can preferably be used as chiral dopants in the mesogenic media according to the present invention.
TABLE F
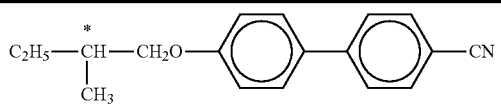
C 15

TABLE F-continued
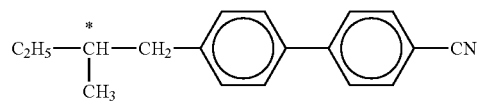
CB 15
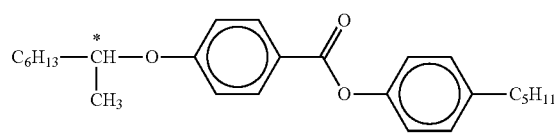
CM 21
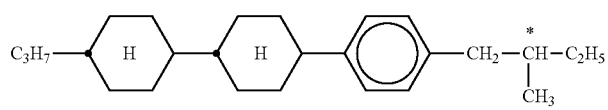
CM 44
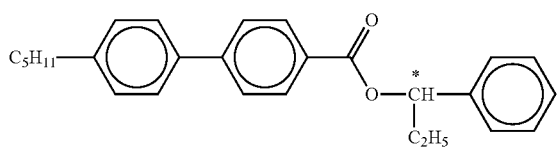
CM 45
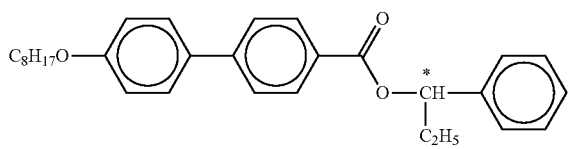
CM 47
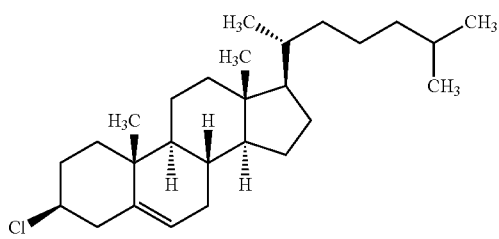
CC
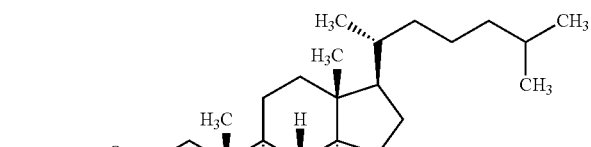
CN
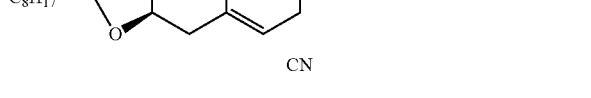
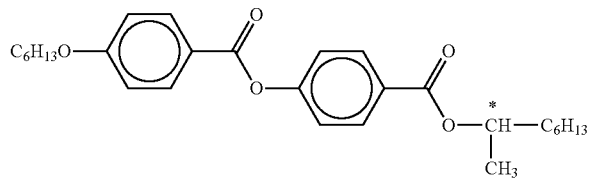
R/S-811

TABLE F-continued

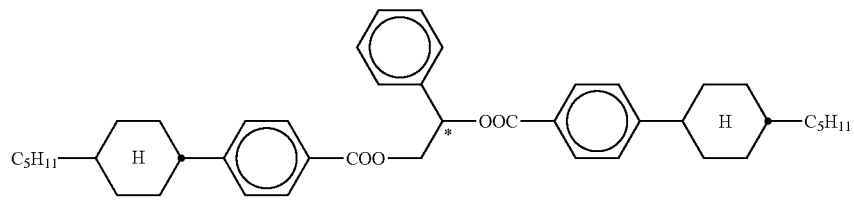

R/S-1011

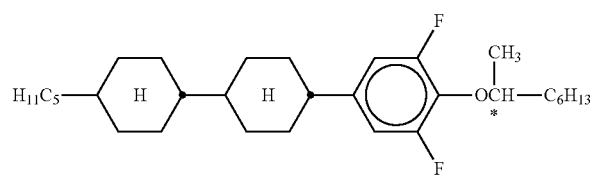

R/S-2011

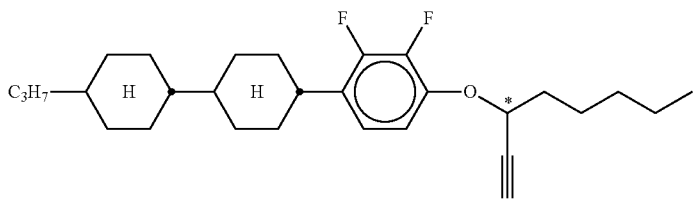

R/S-3011

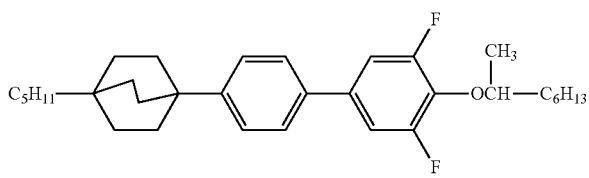

R/S-4011

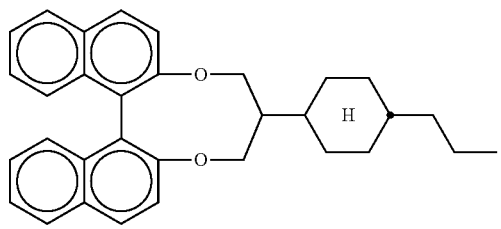

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, individual compounds, preferably of three or more, particularly preferably of four or more, different formulae, selected from the group of the compounds from Table D.

EXAMPLES

The example below illustrates the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared.

Mixture M-1:

Composition
Compound

| No. | Abbreviation | c/% |
|---|---|---|
| 1 | CCQU-2-F | 12.00 |
| 2 | CCQU-3-F | 12.00 |
| 3 | CCQU-5-F | 12.00 |
| 4 | PUQU-2-F | 6.00 |
| 5 | PUQU-3-F | 18.00 |
| 6 | PGUQU-3-F | 8.00 |
| 7 | CPGU-3-OT | 8.00 |
| 8 | PGP-2-3 | 4.00 |
| 9 | PGP-2-4 | 3.00 |
| 10 | CC-4-V | 15.00 |
| 11 | PPGU-3-F | 2.00 |
| Σ | | 100.0 |

Physical properties

T(N, I) = 75.4° C.
$n_e$ (20° C., 589.3 nm) = 1.6015
Δn (20° C., 589.3 nm) = 0.1222
$\varepsilon_{\parallel}$ (20° C., 1 kHz) = 23.3
Δε (20° C., 1 kHz) = 18.8
$k_1$(20° C.) = 10.1 pN
$k_3$(20° C.) = 9.9 pN
$\gamma_1$ (20° C.) = 132 mPa · s
$V_0$ (20° C.) = 0.77 V

The invention claimed is:
1. A liquid-crystal medium having positive dielectric anisotropy, comprising:
60% or more by weight of one or more compounds of formula I and 5% or more by weight of one or more compounds of formula II

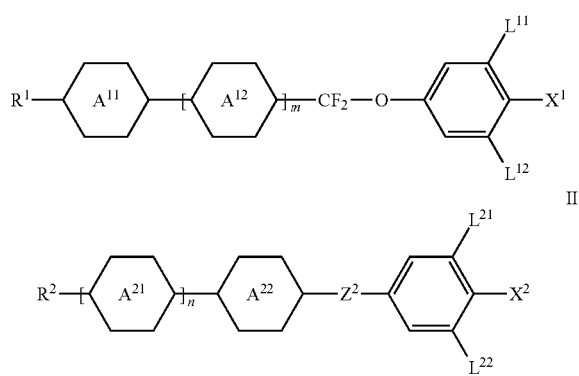

wherein
$R^1$ and $R^2$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

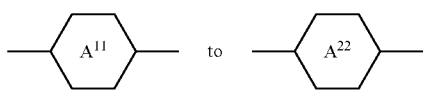

on each appearance, independently of one another, denote

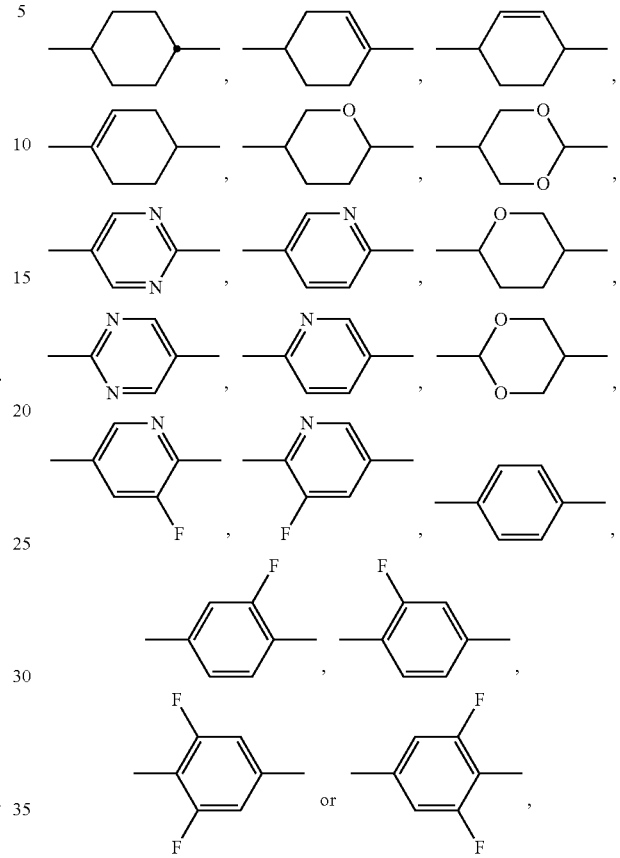

$L^{11}$, $L^{12}$, $L^{21}$ and $L^{22}$, independently of one another, denote H or F, $X^1$ and $X^2$, independently of one another, denote halogen, halogenated alkyl or alkoxy having 1 to 3 C atoms or halogenated alkenyl or alkenyloxy having 2 or 3 C atoms, $Z^2$ denotes —CH$_2$CH$_2$—, —CF$_2$CF$_2$—, —COO—, trans-CH═CH—, trans-CF═CF—, —CH$_2$O— or a single bond, and m and n, independently of one another, denote 0, 1, 2 or 3;

10-20% by weight of one or more compounds of formula III

wherein
$R^{31}$ and $R^{32}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

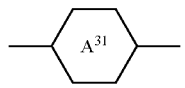

and

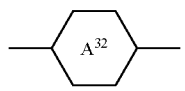

independently of one another and, if

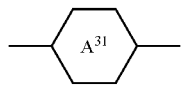

occurs twice, also these independently of one another, denote

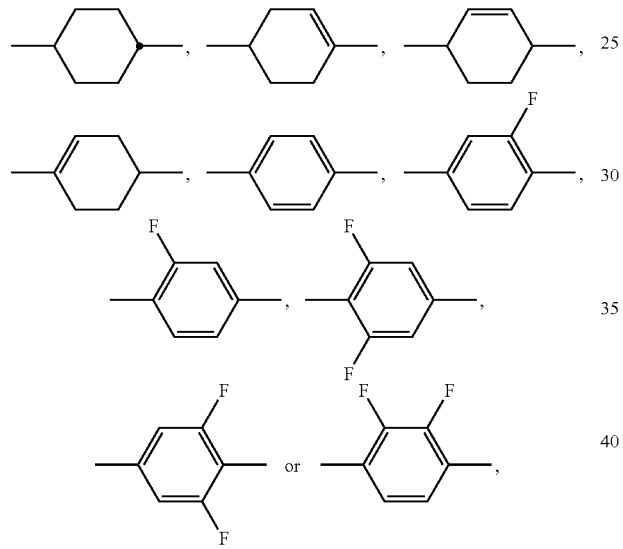

$Z^{31}$ and $Z^{32}$, independently of one another and, if $Z^{31}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2, and wherein said compounds of formula III are not compounds of formula I or formula II; and 1-12% by weight of one or more compounds of the following formula PGP-n-m

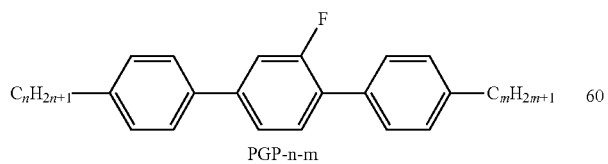

wherein n and m each, independently, denote 1 to 7; wherein the 60% or more by weight of compounds of formula I includes 31% to 42% by weight of compounds selected from compounds of formulae I-1a and I-1b

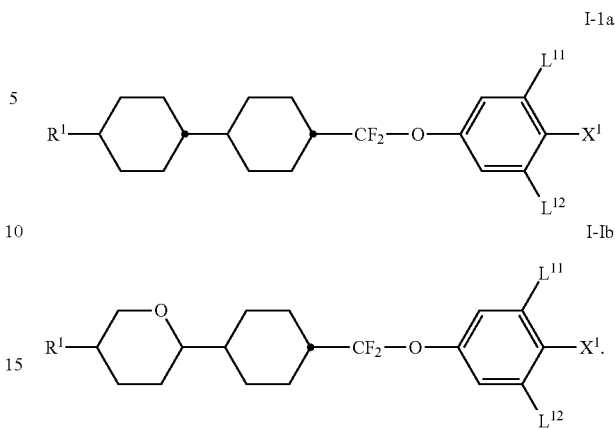

2. The medium according to claim 1, wherein said medium comprises one or more compounds of formula I-1d

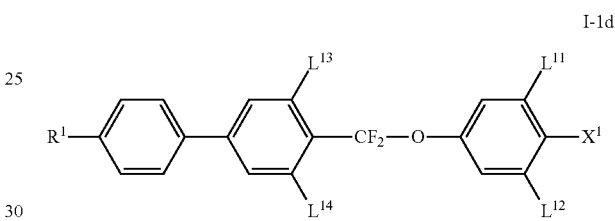

wherein $R^1$, $L^{11}$, $L^{12}$ and $X^1$ are defined as indicated in claim 1, and $L^{13}$ and $L^{14}$ denote H or F, and wherein the 60% or more by weight of compounds of formula I includes 23% or more of compounds of formula I-1d.

3. The medium according to claim 1, wherein the 60% or more by weight of compounds of formula I comprises one or more compounds selected from formula I-2c

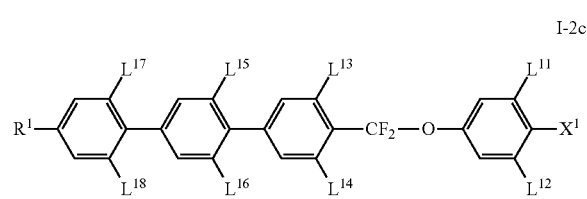

wherein $R^1$, $X^1$, $L^{11}$, and $L^{12}$ are as defined in claim 1, and $L^{13}$ to $L^{18}$ denote H or F.

4. The medium according to claim 1, wherein the 5% or more by weight of compounds of formula II comprises a compound of formula II-2d-2

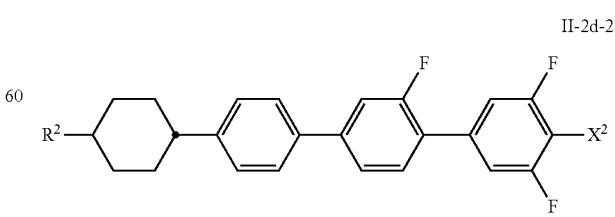

wherein $R^2$ is as defined in claim 1, and $X^2$ denotes F or OCF$_3$.

5. The medium according to claim 1, wherein the 5% or more by weight of compounds of formula II comprises a compound of formula II-2e-1

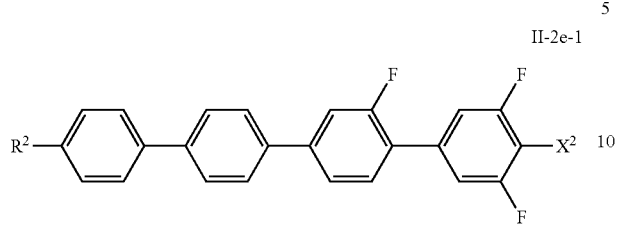

II-2e-1 wherein $R^2$ is as defined in claim 1, and $X^2$ denotes F.

6. The medium according to claim 1, wherein said medium further comprises one or more compounds of formula IV

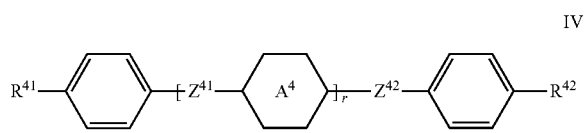

IV in which $R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

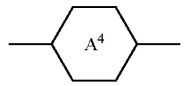

if it occurs twice in each case independently of one another on each occurrence, denotes

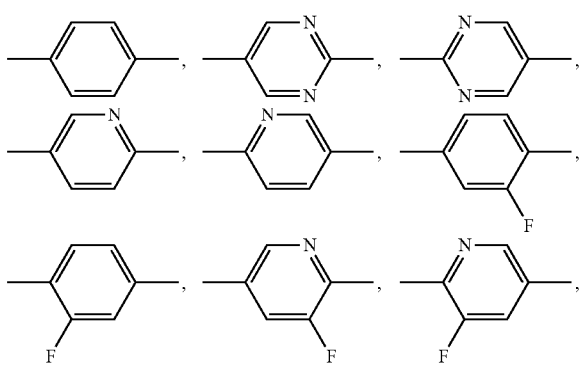

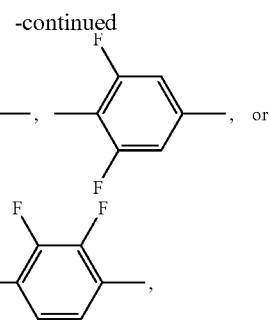

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O— or a single bond, and r denotes 0, 1 or 2.

7. The medium according to claim 1, wherein the total concentration of the compounds of formula I and II is 95% by weight or less.

8. A liquid-crystal display containing a medium according to claim 1.

9. A process for the preparation of a medium according to claim 1, comprising:
mixing one or more compounds of formulae I and II with one or more of the compounds of formula III, and optionally one or more further compounds wherein said one or more further compounds are mesogenic.

10. A process for the preparation of a medium according to claim 6, comprising:
mixing one or more compounds of the formulae I and II with one or more of the compounds of formula IV, and optionally one or more further compounds wherein said one or more further compounds are mesogenic.

11. The medium according to claim 1, wherein the 60% or more by weight of compounds of formula I includes 32% to 40% by weight of compounds selected from compounds of formula I-1a and I-1b.

12. The medium according to claim 1, wherein the 60% or more by weight of compounds of formula I includes 35% to 38% by weight of compounds selected from compounds of formula I-1a and I-1b.

13. The medium according to claim 1, wherein said medium comprises 60% to 90% by weight of compounds of formula I and 5% to 15% by weight of compounds of formula II.

14. The medium according to claim 1, wherein said medium comprises 61% to 85% by weight of compounds of formula I and 7% to 13% by weight of compounds of formula II.

15. The medium according to claim 1, wherein said medium comprises 62% to 80% by weight of compounds of formula I and 8% to 12% by weight of compounds of formula II.

16. The display according to claim 8, wherein said display operates in the Transverse Bend Alignment mode.

* * * * *